(12) United States Patent
Duffield et al.

(10) Patent No.: US 11,397,730 B2
(45) Date of Patent: *Jul. 26, 2022

(54) TIME SERIES DATABASE PROCESSING SYSTEM

(71) Applicant: Palantir Technologies Inc., Palo Alto, CA (US)

(72) Inventors: Benjamin Duffield, New York, NY (US); David Tobin, Atherton, CA (US); Xavier Falco, Cooper City, FL (US); John McRaven, New York, NY (US); Steven Fackler, Menlo Park, CA (US); Pawel Adamowicz, London (GB); Aditya Shashi, Seattle, WA (US)

(73) Assignee: Palantir Technologies Inc., Denver, CO (US)

( * ) Notice: Subject to any disclaimer, the term of this patent is extended or adjusted under 35 U.S.C. 154(b) by 119 days.

This patent is subject to a terminal disclaimer.

(21) Appl. No.: 16/535,575

(22) Filed: Aug. 8, 2019

(65) Prior Publication Data

US 2019/0361885 A1 Nov. 28, 2019

Related U.S. Application Data

(63) Continuation of application No. 15/831,188, filed on Dec. 4, 2017, now Pat. No. 10,417,224.

(Continued)

(51) Int. Cl.
*G06F 16/245* (2019.01)
*G06F 16/248* (2019.01)
(Continued)

(52) U.S. Cl.
CPC .......... *G06F 16/245* (2019.01); *G06F 16/248* (2019.01); *G06F 16/2477* (2019.01); *G06F 16/24542* (2019.01); *G06F 16/258* (2019.01)

(58) Field of Classification Search
CPC ............ G06F 16/245; G06F 16/24542; G06F 16/2477; G06F 16/258; G06F 16/248
See application file for complete search history.

(56) References Cited

U.S. PATENT DOCUMENTS

| 5,532,717 A | 7/1996 | Jones et al. |
| 5,724,575 A | 3/1998 | Hoover et al. |

(Continued)

FOREIGN PATENT DOCUMENTS

| AU | 2014206155 | 12/2015 |
| EP | 0652513 | 5/1995 |

(Continued)

OTHER PUBLICATIONS

Anonymous, "BackTult—JD Edwards One World Version Control System," printed Jul. 23, 2007 in 1 page.

(Continued)

*Primary Examiner* — Mark D Featherstone
*Assistant Examiner* — Faezeh Forouharnejad
(74) *Attorney, Agent, or Firm* — Knobbe, Martens, Olson & Bear, LLP

(57) ABSTRACT

Systems and methods are provided for improved time series databases and time series operations. A time series service responds to requests from external devices. The external devices request time series data and submit time series queries. The time series service generates planned and efficient time series queries from the initial queries. The time series service performs operations such as unit conversion, interpolation, and performing operations on time series data. The time series service can identify which time series database to query from and/or cause data to be populated into a time series database from a data pipeline system.

13 Claims, 10 Drawing Sheets

Related U.S. Application Data

(60) Provisional application No. 62/545,036, filed on Aug. 14, 2017.

(51) Int. Cl.
*G06F 16/25* (2019.01)
*G06F 16/2453* (2019.01)
*G06F 16/2458* (2019.01)

(56) References Cited

U.S. PATENT DOCUMENTS

| | | | |
|---|---|---|---|
| 5,872,973 | A | 2/1999 | Mitchell et al. |
| 5,897,636 | A | 4/1999 | Kaeser |
| 6,073,129 | A | 6/2000 | Levine et al. |
| 6,094,653 | A | 7/2000 | Li et al. |
| 6,161,098 | A | 12/2000 | Wallman |
| 6,243,717 | B1 | 6/2001 | Gordon et al. |
| 6,304,873 | B1 | 10/2001 | Klein et al. |
| 6,366,933 | B1 | 4/2002 | Ball et al. |
| 6,418,438 | B1 | 7/2002 | Campbell |
| 6,510,504 | B2 | 1/2003 | Satyanarayana |
| 6,549,752 | B2 | 4/2003 | Tsukamoto |
| 6,560,620 | B1 | 5/2003 | Ching |
| 6,574,635 | B2 | 6/2003 | Stauber et al. |
| 6,609,085 | B1 | 8/2003 | Uemura et al. |
| 6,745,382 | B1 | 6/2004 | Zothner |
| 6,976,210 | B1 | 12/2005 | Silva et al. |
| 6,980,984 | B1 | 12/2005 | Huffman et al. |
| 7,058,648 | B1 | 6/2006 | Lightfoot et al. |
| 7,111,231 | B1 | 9/2006 | Huck et al. |
| 7,194,680 | B1 | 3/2007 | Roy et al. |
| 7,461,158 | B2 | 12/2008 | Rider et al. |
| 7,725,530 | B2 | 5/2010 | Sah et al. |
| 7,725,728 | B2 | 5/2010 | Ama et al. |
| 7,730,082 | B2 | 6/2010 | Sah et al. |
| 7,730,109 | B2 | 6/2010 | Rohrs et al. |
| 7,761,407 | B1 | 7/2010 | Stern |
| 7,814,084 | B2 | 10/2010 | Hallett et al. |
| 7,962,495 | B2 | 6/2011 | Jain et al. |
| 7,984,374 | B2 | 7/2011 | Caro et al. |
| 8,041,714 | B2 | 10/2011 | Aymeloglu et al. |
| 8,112,425 | B2 | 2/2012 | Baum et al. |
| 8,126,848 | B2 | 2/2012 | Wagner |
| 8,185,819 | B2 | 5/2012 | Sah et al. |
| 8,484,115 | B2* | 7/2013 | Aymeloglu ............ G06Q 40/04 705/36 R |
| 8,504,542 | B2 | 8/2013 | Chang et al. |
| 8,676,857 | B1 | 3/2014 | Adams et al. |
| 8,930,331 | B2 | 1/2015 | McGrew et al. |
| 8,954,410 | B2 | 2/2015 | Chang et al. |
| 9,009,827 | B1 | 4/2015 | Albertson et al. |
| 9,043,696 | B1 | 5/2015 | Meiklejohn et al. |
| 9,092,482 | B2 | 7/2015 | Harris et al. |
| 9,116,975 | B2 | 8/2015 | Shankar et al. |
| 9,195,700 | B1 | 11/2015 | Becker |
| 9,208,159 | B2 | 12/2015 | Stowe et al. |
| 9,230,280 | B1 | 1/2016 | Maag et al. |
| 9,280,532 | B2 | 3/2016 | Cicerone |
| 9,607,067 | B2* | 3/2017 | Haas ............ G06F 16/27 |
| 9,672,257 | B2 | 6/2017 | Tobin et al. |
| 9,753,935 | B1 | 9/2017 | Tobin et al. |
| 9,792,388 | B2 | 10/2017 | Kawabata |
| 10,417,224 | B2 | 9/2019 | Duffield et al. |
| 2001/0051949 | A1 | 12/2001 | Carey et al. |
| 2001/0056522 | A1 | 12/2001 | Satyanarayana |
| 2002/0091694 | A1 | 7/2002 | Hrle et al. |
| 2003/0105759 | A1 | 6/2003 | Bess et al. |
| 2003/0115481 | A1 | 6/2003 | Baird et al. |
| 2003/0120675 | A1 | 6/2003 | Stauber et al. |
| 2003/0130993 | A1 | 7/2003 | Mendelevitch et al. |
| 2003/0212718 | A1 | 11/2003 | Tester |
| 2004/0111410 | A1 | 6/2004 | Burgoon et al. |
| 2004/0117345 | A1 | 6/2004 | Bamford et al. |
| 2004/0117387 | A1 | 6/2004 | Civetta et al. |
| 2004/0148301 | A1 | 7/2004 | McKay et al. |
| 2005/0097441 | A1 | 5/2005 | Herbach et al. |
| 2005/0108231 | A1 | 5/2005 | Findleton et al. |
| 2005/0114763 | A1 | 5/2005 | Nonomura et al. |
| 2005/0131990 | A1 | 6/2005 | Jewell |
| 2005/0289524 | A1 | 12/2005 | McGinnes |
| 2006/0074881 | A1 | 4/2006 | Vembu et al. |
| 2006/0080316 | A1 | 4/2006 | Gilmore et al. |
| 2006/0095521 | A1 | 5/2006 | Patinkin |
| 2006/0106847 | A1 | 5/2006 | Eckardt et al. |
| 2006/0116991 | A1 | 6/2006 | Calderwood |
| 2006/0161558 | A1 | 7/2006 | Tamma et al. |
| 2006/0218206 | A1 | 9/2006 | Bourbonnais et al. |
| 2006/0218405 | A1 | 9/2006 | Ama et al. |
| 2006/0218491 | A1 | 9/2006 | Grossman et al. |
| 2006/0242617 | A1 | 10/2006 | Bellas et al. |
| 2006/0242630 | A1 | 10/2006 | Koike et al. |
| 2006/0253502 | A1 | 11/2006 | Raman et al. |
| 2006/0265397 | A1 | 11/2006 | Bryan et al. |
| 2006/0288035 | A1 | 12/2006 | Viavant |
| 2007/0050429 | A1 | 3/2007 | Goldring et al. |
| 2007/0061487 | A1 | 3/2007 | Moore et al. |
| 2007/0143253 | A1 | 6/2007 | Kostamaa et al. |
| 2007/0185850 | A1 | 8/2007 | Walters et al. |
| 2007/0233756 | A1 | 10/2007 | D'Souza et al. |
| 2007/0271317 | A1 | 11/2007 | Carmel |
| 2008/0015970 | A1 | 1/2008 | Brookfield et al. |
| 2008/0104060 | A1 | 5/2008 | Abhyankar et al. |
| 2008/0104149 | A1 | 5/2008 | Vishniac et al. |
| 2008/0195672 | A1 | 8/2008 | Hamel et al. |
| 2008/0201339 | A1 | 8/2008 | McGrew |
| 2008/0215546 | A1 | 9/2008 | Baum et al. |
| 2008/0270316 | A1 | 10/2008 | Guidotti et al. |
| 2008/0285383 | A1* | 11/2008 | An ............ G01V 1/28 367/38 |
| 2008/0301378 | A1 | 12/2008 | Carrie |
| 2009/0031247 | A1 | 1/2009 | Walter et al. |
| 2009/0106308 | A1 | 4/2009 | Killian et al. |
| 2009/0164387 | A1 | 6/2009 | Armstrong et al. |
| 2009/0177962 | A1 | 7/2009 | Gusmorino et al. |
| 2009/0254971 | A1 | 10/2009 | Herz |
| 2009/0271435 | A1 | 10/2009 | Yako et al. |
| 2009/0313223 | A1 | 12/2009 | Rantanen |
| 2009/0313311 | A1 | 12/2009 | Hoffmann et al. |
| 2010/0036831 | A1 | 2/2010 | Vemuri et al. |
| 2010/0070489 | A1 | 3/2010 | Aymeloglu et al. |
| 2010/0076939 | A1 | 3/2010 | Iwaki et al. |
| 2010/0082541 | A1 | 4/2010 | Kottomtharayil |
| 2010/0114817 | A1 | 5/2010 | Broeder et al. |
| 2010/0114831 | A1 | 5/2010 | Gilbert et al. |
| 2010/0114887 | A1 | 5/2010 | Conway et al. |
| 2010/0138842 | A1 | 6/2010 | Balko et al. |
| 2010/0145909 | A1 | 6/2010 | Ngo |
| 2010/0161565 | A1 | 6/2010 | Lee et al. |
| 2010/0161688 | A1 | 6/2010 | Kesselman et al. |
| 2010/0191884 | A1 | 7/2010 | Holenstein et al. |
| 2010/0211550 | A1 | 8/2010 | Daniello et al. |
| 2010/0211618 | A1 | 8/2010 | Anderson et al. |
| 2010/0235606 | A1 | 9/2010 | Oreland et al. |
| 2010/0283787 | A1 | 11/2010 | Hamedi et al. |
| 2010/0325581 | A1 | 12/2010 | Finkelstein et al. |
| 2011/0029498 | A1 | 2/2011 | Ferguson et al. |
| 2011/0047540 | A1 | 2/2011 | Williams et al. |
| 2011/0153592 | A1 | 6/2011 | DeMarcken |
| 2011/0173619 | A1 | 7/2011 | Fish |
| 2011/0184813 | A1 | 7/2011 | Barne et al. |
| 2011/0218978 | A1 | 9/2011 | Hong et al. |
| 2011/0258158 | A1 | 10/2011 | Resende et al. |
| 2011/0258242 | A1 | 10/2011 | Eidson et al. |
| 2011/0270812 | A1 | 11/2011 | Ruby |
| 2012/0072825 | A1 | 3/2012 | Sherkin et al. |
| 2012/0123989 | A1 | 5/2012 | Yu et al. |
| 2012/0124179 | A1 | 5/2012 | Cappio et al. |
| 2012/0150791 | A1 | 6/2012 | Willson |
| 2012/0150925 | A1 | 6/2012 | Gupta et al. |
| 2012/0159307 | A1 | 6/2012 | Chung et al. |
| 2012/0221589 | A1 | 8/2012 | Shahar et al. |
| 2012/0330908 | A1 | 12/2012 | Stowe et al. |
| 2012/0330931 | A1 | 12/2012 | Nakano et al. |
| 2013/0036346 | A1 | 2/2013 | Cicerone |

(56) References Cited

U.S. PATENT DOCUMENTS

| | | |
|---|---|---|
| 2013/0060742 A1 | 3/2013 | Chang et al. |
| 2013/0066882 A1 | 3/2013 | Westbrooke |
| 2013/0097130 A1 | 4/2013 | Bingol et al. |
| 2013/0151388 A1 | 6/2013 | Falkenborg et al. |
| 2013/0304770 A1 | 11/2013 | Boero et al. |
| 2013/0318060 A1 | 11/2013 | Chang et al. |
| 2014/0040276 A1 | 2/2014 | Chen et al. |
| 2014/0095543 A1 | 4/2014 | Hsiao et al. |
| 2014/0149272 A1 | 5/2014 | Hirani et al. |
| 2014/0172867 A1* | 6/2014 | Lin .................... G06F 16/2272 707/741 |
| 2014/0181833 A1 | 6/2014 | Bird et al. |
| 2014/0324876 A1 | 10/2014 | Konik et al. |
| 2014/0344231 A1 | 11/2014 | Stowe et al. |
| 2015/0039886 A1 | 2/2015 | Kahol et al. |
| 2015/0089353 A1 | 3/2015 | Folkening |
| 2015/0106347 A1 | 4/2015 | McGrew et al. |
| 2015/0112956 A1 | 4/2015 | Chang et al. |
| 2015/0186434 A1 | 7/2015 | Eichinger et al. |
| 2015/0212663 A1 | 7/2015 | Papale et al. |
| 2015/0213043 A1 | 7/2015 | Ishii et al. |
| 2015/0213134 A1 | 7/2015 | Nie et al. |
| 2015/0227295 A1 | 8/2015 | Meiklejohn et al. |
| 2015/0242397 A1 | 8/2015 | Zhuang |
| 2015/0261817 A1 | 9/2015 | Harris et al. |
| 2015/0278325 A1 | 10/2015 | Masuda et al. |
| 2015/0341467 A1 | 11/2015 | Lim et al. |
| 2015/0379065 A1 | 12/2015 | Yoshizawa et al. |
| 2016/0034545 A1 | 2/2016 | Shankar et al. |
| 2016/0062555 A1 | 3/2016 | Ward et al. |
| 2016/0164912 A1 | 6/2016 | Del Fante |
| 2016/0328432 A1 | 11/2016 | Raghunathan |
| 2017/0031742 A1* | 2/2017 | Jilani .................. G06F 11/0787 |
| 2017/0270172 A1 | 9/2017 | Tobin et al. |
| 2017/0309094 A1 | 10/2017 | Farahat |
| 2018/0039651 A1 | 2/2018 | Tobin et al. |
| 2019/0050453 A1 | 2/2019 | Duffield et al. |

FOREIGN PATENT DOCUMENTS

| | | |
|---|---|---|
| EP | 2555126 | 2/2013 |
| EP | 2863326 | 4/2015 |
| EP | 2891992 | 7/2015 |
| EP | 2993595 | 3/2016 |
| EP | 3101560 | 12/2016 |
| EP | 3279813 | 2/2018 |
| EP | 3444733 | 2/2019 |
| WO | WO 2008/043082 | 4/2008 |
| WO | WO 2012/025915 | 3/2012 |
| WO | WO 2014/019349 | 2/2014 |

OTHER PUBLICATIONS

Antoshenkov, Gennady, "Dictionary-Based Order-Preserving String Compression", The VLDB Journal, pp. 26-39, 1997.

Apache HBase.

The Apache Cassandra Project.

Baker et al., "Megastore: Providing Scalable, Highly Available Storage for Interactive Services", 5th Biennial Conference on Innovative Data Systems Research (CIDR '11), Asilomar, California, Jan. 9-12, 2011.

Bernstein et al., "Hyder—A Transactional Record Manager for Shared Flash", 5th Biennial Conference on Innovative Data Systems Research (CIDR '11), vol. 12, Asilomar, California, Jan. 9-12, 2011.

Chang et al., "Bigtable: A Distributed Storage System for Structured Data", Google, Inc., OSDI'06: Seventh Symposium on Operating System Design and Implementation, Seattle, WA, Nov. 2006.

Chung, Chin-Wan, "Dataplex: An Access to Heterogeneous Distributed Databases", Communications of the ACM, Association for Computing Machinery, Inc., vol. 33, Issue No. 1, pp. 70-80, Jan. 1, 1990.

Devanbu et al., "Authentic Third-party Data Publication", http://www.cs.ucdavis.edu/~devanbu/authdbpub.pdf, p. 19, accessed on Feb. 6, 2012.

Dreyer et al., "An Object-Oriented Data Model for a Time Series Management System," Proceedings of the 7th International Working Conference on Scientific and Statistical Database Management, Charlottesville, Virginia USA, Sep. 28-30, 1994, pp. 12.

Elmasri et al., "Fundamentals of Database Systems", Fourth Edition, pp. 455-491, 2004, Jan. 23, 2021.

Hogue et al., "Thresher: Automating the Unwrapping of Semantic Content from the World Wide Web", 14th International Conference on World Wide Web, WWW 2005: Chiba, Japan, May 10-14, 2005.

Klemmer et al., "Where Do Web Sites Come From? Capturing and Interacting with Design History," Association for Computing Machinery, CHI 2002, Apr. 20-25, 2002, Minneapolis, MN, pp. 8.

Kokossi et al., "D7-Dynamic Ontology Management System (Design)", Information Societies Technology Programme, pp. 1-27.

Mentzas et al. "An Architecture for Intelligent Assistance in the Forecasting Process," Proceedings of the Twenty-Eighth Hawaii International Conference on System Sciences, Jan. 3-6, 1995, vol. 3, pp. 167-176.

Miklau et al., "Securing History: Privacy and Accountability in Database Systems," 3 rd Biennial Conference on Innovative Data Systems Research (CIDR), Jan. 7-10, 2007, Asilomar, California, pp. 387-396.

Niepert et al., "A Dynamic Ontology for a Dynamic Reference Work", Joint Conference on Digital Libraries, Jun. 17_22, 2007, Vancouver, British Columbia, Canada, pp. 1-10.

Nierman, "Evaluating Structural Similarity in XML Documents", 6 pages, 2002.

Peng et al., "Large-scale Incremental Processing Using Distributed Transactions and Notifications", Proceedings of the 9th USENIX Symposium on Operating Systems Design and Implementation, USENIX, p. 14, 2010.

Piotr Przymus: "Query optimization in heterogeneous CPU/GPU environment for time series databases Summary of PhD dissertation", Mar. 19, 2014, XP055526414, Retrieved from the Internet: URL: https://depotuw.ceon.pl/bitstream/handle/item/795/konspekt pp.pdf?sequence=3 [retrieved on Nov. 23, 2018].

Quest, "Toad for Oracle 11.6—Guide to Using Toad," Sep. 24, 2012, pp. 1-162.

Thomson et al., "The Case for Determinism in Database Systems", The 36th International Conference on Very Large Data Bases, Proceedings of the VLDB Endowment, vol. 3, Issue No. 1, p. 11, Singapore, Sep. 13-17, 2010.

Wikipedia, "Federated Database System," Sep. 7, 2013, retrieved from the internet on Jan. 27, 2015 http://en.wikipedia.org/w/index.php?title=Federated_database_system&oldid=571954221.

Wollrath et al., "A Distributed Object Model for the Java System," Conference on Object-Oriented Technologies and Systems, Jun. 17-21, 1996, pp. 219-231.

Yang et al., "HTML Page Analysis Based on Visual Cues", A129, pp. 859-864, 2001.

Yijian Bai et al.: "A Flexible Query Graph Based Model for the Efficient Execution of Continuous Queries" Data Engineering Workshop, 2007 IEEE 23rd international conference on, IEEE, PI, Apr. 1, 2007, pp. 634-643, XP031189314, ISBN: 978-1-4244-0831-3.

Yijian Bai et al: "Efficient Support for Time Series Queries in Data Stream Management Systems" In: "Stream Data Management", Jan. 1, 2005, Springer-Verlag. New York, XP055526418, ISBN: 978-0-387-24393-I, vol. 30, pp. 113-132.

Zhao et al., "Exploratory Analysis of Time-Series with ChronoLenses," IEEE Transactions on Visualization and Computer Graphics, vol. 17, No. 12, Oct. 23, 2011, pp. 2422-2431.

Official Communication for European Patent Application No. 18188782.9 dated Dec. 7, 2018.

Notice of Allowance for U.S. Appl. No. 15/831,188 dated May 14, 2019.

Notice of Allowance for U.S. Appl. No. 15/831,188 dated Feb. 20, 2019.

Official Communication for U.S. Appl. No. 15/831,188 dated Sep. 17, 2018.

(56) References Cited

OTHER PUBLICATIONS

Official Communication for U.S. Appl. No. 15/831,188 dated Mar. 22, 2018.
Official Communication for European Patent Application No. 18188782.9 dated Apr. 17, 2020, 9 pages.
Elmasri, et al.; Fundamentals of Database Systems; Fourth Edition XP-002333626; Pearson-Addison Wesley 04/1450 EPA EPO OEB; ISBN 0-321-20448-4; in 113 pages.
Official Communication for European Patent Application No. 18188782.9 dated Jul. 14, 2021.

* cited by examiner

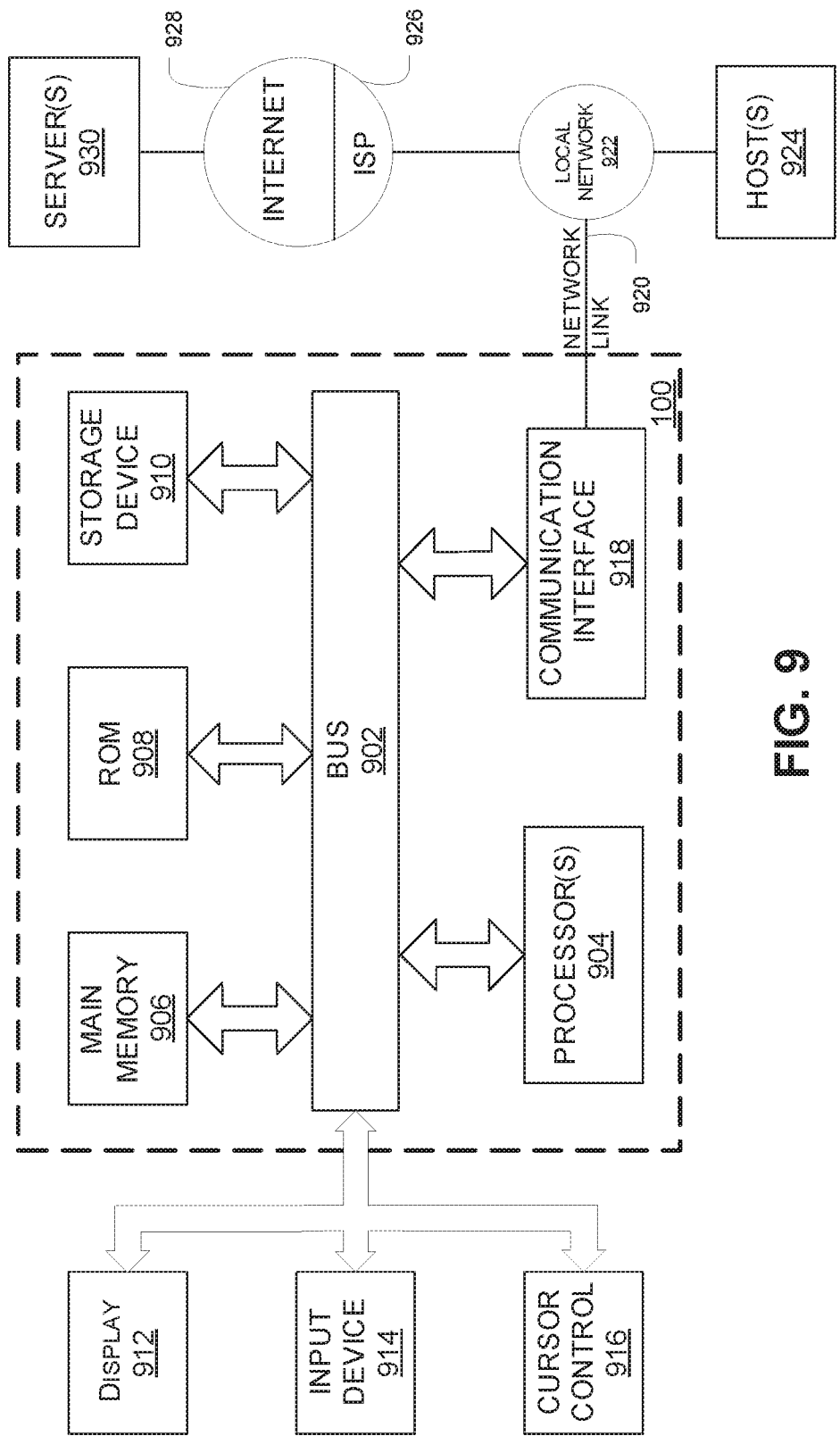

TIME SERIES DATABASE PROCESSING SYSTEM

INCORPORATION BY REFERENCE TO ANY PRIORITY APPLICATIONS

This application is a continuation of U.S. patent application Ser. No. 15/831,188, filed on Aug. 4, 2017, which claims benefit of U.S. Provisional Patent Application Ser. No. 62/545,036 entitled "Time Series Database Processing System" filed Aug. 14, 2017, which is hereby incorporated by reference in its entirety.

Any and all applications for which a foreign or domestic priority claim is identified in the Application Data Sheet as filed with the present application are hereby incorporated by reference under 37 CFR 1.57.

BACKGROUND

A database may store a large amount of time series data.

SUMMARY

The systems, methods, and devices described herein each have several aspects, no single one of which is solely responsible for its desirable attributes. Without limiting the scope of this disclosure, several non-limiting features will now be discussed briefly.

According to an embodiment, a system is disclosed comprising: a time series database configured to store a first time series and a second time series; a non-transitory computer storage medium configured to store metadata associated with a time series; and one or more hardware computer processors programmed, via executable code instructions, to implement a time series service to: receive a time series request comprising a first time series expression, the first time series expression comprising a first time series indicator; retrieve, from the non-transitory computer storage medium, metadata using the first time series indicator; generate a second time series expression using the metadata and the first time series expression; retrieve, from the time series database, the first time series and the second time series; perform, according to the second time series expression, an operation on first data associated with the first time series and second data associated with the second time series to generate third data; and transmit the third data.

According to an aspect, the first time series expression may further comprise a plurality of nodes, wherein each node of two or more of the plurality of nodes correspond to a time series operation.

According to another aspect, generating the second time series expression may further comprise: identifying two or more of the plurality of nodes that correspond to the time series operation; and generating a combined operation node from the two or more of the plurality of nodes, wherein the second time series expression comprises the combined operation node instead of the two or more of the plurality of nodes.

According to yet another aspect, the first time series expression may further comprise an indicator for the operation, wherein the non-transitory computer storage medium is further configured to store: first metadata comprising a first association between the first time series and a first time unit, and second metadata comprising a second association between the second time series and a second time unit, and wherein the one or more computer hardware processors are further configured to at least: determine, using the first metadata and the second metadata, that the first time unit and the second time unit are different; determine that the second time unit is more granular than the first time unit; identify a first set of timestamps from the first time series and a second set of timestamps from the second time series; identify, from the second set of timestamps, a second subset of timestamps that correspond to a granularity of the first second time unit; generate a normalized set of timestamps from the first set of timestamps and the second time unit; generate, from the first time series and the normalized set of timestamps, a first normalized data set; and generate, from the first second time series and the first second set of timestamps, a first second data set; generate, from the second time series and the second subset of timestamps, a second interpolated data set, wherein the first data comprises the first normalized data set, the second data comprises the second interpolated data set, and the third data comprises a third time series.

According to yet another aspect, generating the normalized set of timestamps from the first set of timestamps and the second time unit may further comprise: applying a time scaling function to each timestamp from the first set of timestamps, wherein the time scaling function converts a timestamp from the first time unit to the second time unit.

According to yet another aspect, the time scaling function may comprise at least one of a multiplication operation or a division operation.

According to yet another aspect, the first time series expression may further comprise an indicator for the operation, wherein the non-transitory computer storage medium is further configured to store: first metadata comprising a first association between the first time series and a first time unit, and second metadata comprising a second association between the second time series and a second time unit, and wherein the one or more computer hardware processors are further configured to at least: determine, using the first metadata and the second metadata, that the first time unit and the second time unit are different; determine that the second time unit is more granular than the first time unit; identify a first set of timestamps from the first time series and a second set of timestamps from the second time series; identify, from the second set of timestamps, a second subset of timestamps that correspond to a granularity of the first time unit; generate, from the first time series and the first set of timestamps, a first data set; generate, from the second time series and the second subset of timestamps, a second interpolated data set, wherein the first data comprises the first data set, the second data comprises the second interpolated data, and the third data comprises a third time series.

According to another aspect, the first time series expression may further comprise a second time series indicator for a third time series, and wherein the one or more computer hardware processors are further configured to at least: determine that a second time series is not present in the time series database; cause the data pipeline system to store, in the time series database, the third time series; and store, in the non-transitory computer storage medium, third metadata comprising a third association between the third time series and the third time unit.

According to yet another aspect, the time series request may further comprise an interpolation configuration parameter that indicate a type of interpolation to be performed.

According to another aspect, the first time series expression may further comprise an indicator for an operation, the operation comprising at least one of: an addition operation, a subtraction operation, a division operation, a multiplication operation, a ratio determination operation, a square root operation, a zScore operation, a standard deviation operation, an average operation, a median operation, a mode of operation, a range operation, a maximum operation, or a minimum operation.

According to another embodiment, a method for a time series service is disclosed comprising: receiving a time series request comprising a first time series expression, the first time series expression comprising a first time series indicator; retrieving, from a non-transitory computer storage medium, metadata using the first time series indicator; generating a second time series expression using the metadata and the first time series expression; retrieving, from a time series database, a first time series and a second time series; performing, according to the second time series expression, an operation on first data associated with first time series and second data associated with the second time series to generate third data; and transmitting the third data, wherein the method is performed by a hardware computer processor According to an aspect, the first time series expression may further comprise a plurality of nodes, wherein each node of two or more of the plurality of nodes correspond to a time series operation.

According to another aspect, generating the second time series expression may further comprise: identifying the two or more of the plurality of nodes that correspond to the time series operation; and generating a combined operation node from the two or more of the plurality of nodes, wherein the second time series expression comprises the combined operation node instead of the two or more of the plurality of nodes.

According to yet another aspect, the method may further comprise retrieving, from the non-transitory computer storage medium, first metadata comprising a first association between the first time series and a first time unit, and second metadata comprising a second association between the second time series and a second time unit; determining, using the first metadata and the second metadata, that the first time unit and the second time unit are different; determining that the second time unit is more granular than the first time unit; identifying a first set of timestamps from the first time series and a second set of timestamps from the second time series; generating a normalized data set from the first time series and the second time unit, the first data comprising the normalized data set.

According to yet another aspect, the method may further comprise retrieving, from the non-transitory computer storage medium, first metadata comprising a first association between the first time series and a first time unit, and second metadata comprising a second association between the second time series and a second time unit; determining, using the first metadata and the second metadata, that the first time unit and the second time unit are different; determining that the second time unit is more granular than the first time unit; identifying a first set of timestamps from the first time series and a second set of timestamps from the second time series; identifying, from the second set of timestamps, a second subset of timestamps that correspond to a granularity of the first time unit; generating, from the first time series and the first set of timestamps, a first data set; and generating, from the second time series and the second subset of timestamps, a second interpolated data set, wherein the first data comprises the first data set, the second data comprises the second interpolated data, and the third data comprises a third time series.

According to another aspect, the first time series expression may further comprise a second time series indicator for a third time series, further comprising: determining that a second time series is not present in the time series database; causing the data pipeline system to store, in the time series database, the third time series; and storing, in the non-transitory computer storage medium, third metadata comprising a third association between the third time series and the third time unit.

According to yet another aspect, the time series request may further comprise an interpolation configuration parameter that indicate a type of interpolation to be performed.

Various combinations of the above and below recited features, embodiments and aspects are also disclosed and contemplated by the present disclosure.

Additional embodiments of the disclosure are described below in reference to the appended claims, which may serve as an additional summary of the disclosure.

In various embodiments, systems and/or computer systems are disclosed that comprise a computer readable storage medium having program instructions embodied therewith, and one or more processors configured to execute the program instructions to cause the one or more processors to perform operations comprising one or more aspects of the above- and/or below-described embodiments (including one or more aspects of the appended claims).

In various embodiments, computer-implemented methods are disclosed in which, by one or more processors executing program instructions, one or more aspects of the above- and/or below-described embodiments (including one or more aspects of the appended claims) are implemented and/or performed.

In various embodiments, computer program products comprising a computer readable storage medium are disclosed, wherein the computer readable storage medium has program instructions embodied therewith, the program instructions executable by one or more processors to cause the one or more processors to perform operations comprising one or more aspects of the above- and/or below-described embodiments (including one or more aspects of the appended claims).

BRIEF DESCRIPTION OF THE DRAWINGS

FIG. 9 is a block diagram illustrating an example time series service with which various methods and systems discussed herein may be implemented.

DETAILED DESCRIPTION

Overview

Figure 1:
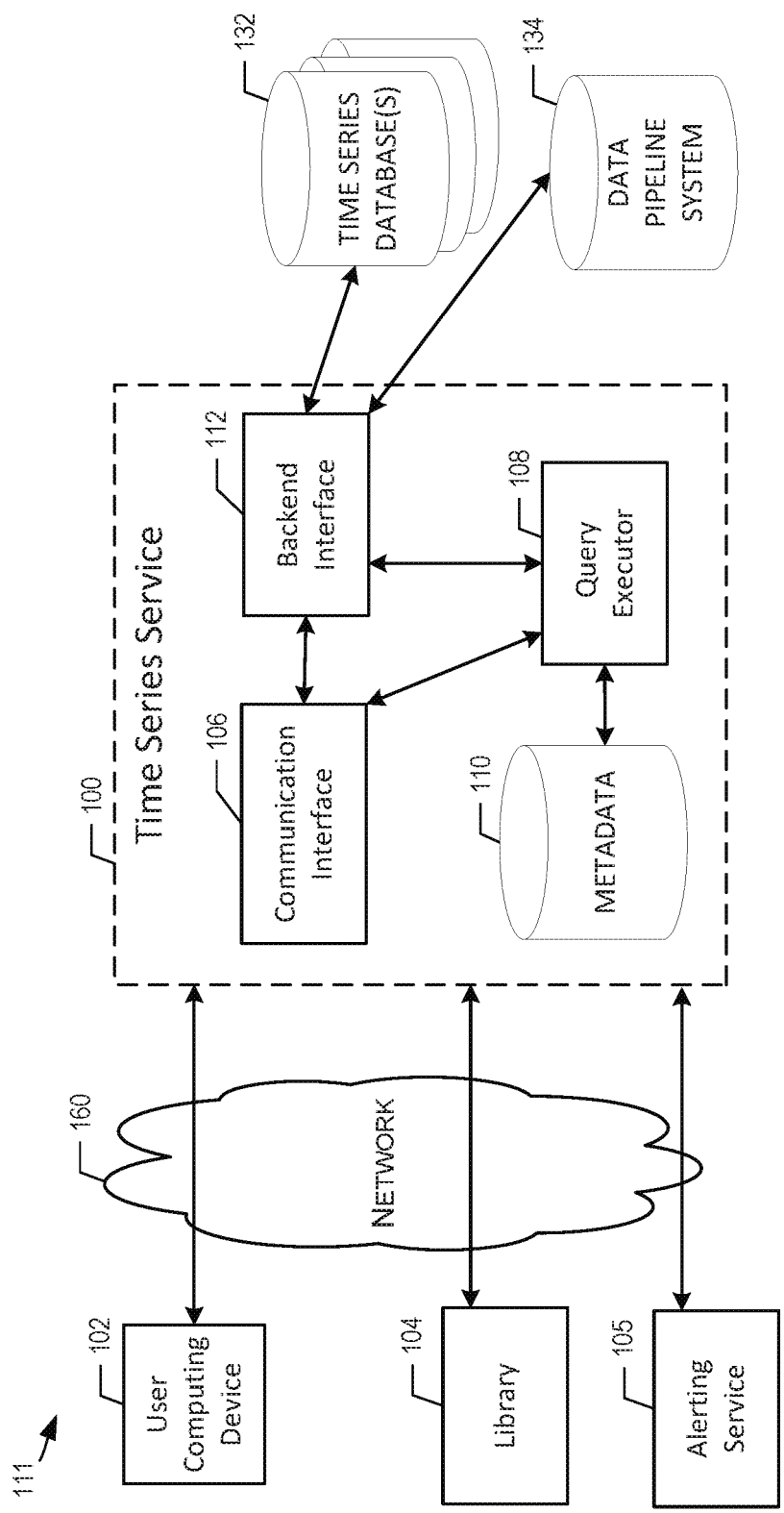
FIG. 1 is a block diagram illustrating a time series service, according to some embodiments of the present disclosure.

A time series database can be queried. The time series database may include time series data captured from one or more sensors. A system that allows users to analyze time series data may include a database server and a user computing device. The user computing device may provide information to the database server regarding the type of analysis desired by the user. The database server may retrieve the appropriate data from the database, perform the analysis, and provide the results to the user device for display. The user may attempt to analyze a single set of time series data (for example, data measured by a single sensor and/or captured from a single data source over a period of time) or multiple sets of time series data (for example, data measured by multiple sensors and/or captured from multiple data sources over a period of time). The time series data may be associated with one or more time units and/or the time series data may be stored at a particular frequency, such as 50 or 60 hertz. Such analysis may include viewing the time series data at different periods of time, viewing the time series data at different zoom levels, simultaneously viewing different time series data over the same time period, combining (for example, adding, subtracting, dividing, multiplying, determining a ratio, determining a zScore, determining a square root, etc.) different time series data to generate new time series data.

Disclosed herein are systems and methods that may be used to advantageously improve time-series-related functionality. A time series service may receive and respond to requests from external applications and/or libraries on behalf of one or more time series databases and/or data pipeline systems. The time series service may function as a middleware layer. The time series service may receive initial time series queries and may generate planned queries from the initial queries. The planned queries may efficiently query the one or more time series databases and/or data pipeline systems. The time series service can enable time series operations between time series data sets of different units by automatically performing interpolation and/or normalization. The time series service can also identify which of multiple time series databases to query based on efficiency and/or trigger population or hydration of time series data from a data pipeline system if the data is missing in a database.

The systems and methods described herein may improve computer-related technology. Despite substantial advances in computer processing power over the past years, some time-series-related computing tasks may still take impractically long amounts of time, especially when many gigabytes, terabytes, petabytes, or exabytes of data are involved. In some embodiments, a time series service may improve a time series system, a time series database, and/or graphical user interfaces for viewing and/or interacting with time series. A time series service may act as a middleware layer between an external requesting device, such as a graphical user interface and/or a library, and a time series database. Accordingly, a time series service can handle computational processing that may otherwise have to be performed by a front-end or backend system. Thus, time-series-related processing may be offloaded to the time series service which may enable the front-end or backend systems to perform less computational processing, have a lighter hardware footprint, and/or have less application logic.

A time series service may result in faster and/or more efficient responses to time series requests and/or queries. The time series service can receive a time series request that includes a time series expression. A time series system may respond to the time series request by executing the time series expression. However, the time series expression as originally submitted may be inefficient. In some embodiments, the time series service can rewrite and/or generate a new time series expression from the original time series expression. Execution of a new time series expression may advantageously result in a faster processing time and/or use less computing resources than execution of the originally submitted time series expression, which may improve computer-related technology.

A time series service may include logic or instructions that improve time series databases. A time series service can include logic that enables time series expressions to be applied to time series that have different time units and/or that correspond to data that is stored at different frequencies, such as, 60 hertz or 60 times a second in contrast to 50 hertz or 50 times a second. In some time series systems that do not include a time series service, if a time series database included time series data in different time units or in different frequencies, the time series system may be required to re-ingest the time series data into a common time unit, which may be computationally expensive and/or may require larger data storage. Thus, some time series service embodiments can handle time series requests that are related to time series of different time units that allows the underlying time series data to be efficiently stored in different time units.

The systems and methods described herein may be intrinsically tied to database and/or computer technology because such solutions may be related to communication over computer networks, Application Programming Interfaces, data processing, and/or time-series technology. The data processing techniques and solutions described herein may be intrinsically tied to time series databases. Thus, the processes for efficiently servicing time series requests and/or queries may be intrinsically tied to database technology.

Example Time Series Service Overview

FIG. 1 illustrates a time series service 100, according to some embodiments of the present disclosure. In the embodiment of FIG. 1, the database environment 111 can include a network 160, a time series service 100, a user computing device 102, a library 104, an alerting service 105, one or more time series databases 132, and a data pipeline system 134. Various communications between these devices are illustrated. For example, the user computing device 102 may send user input, such as time series queries and/or expressions generated from user interface selections, to the time series service 100. The user computing device 102 may enable a user to interact with time series data using a graphical user interface, such as the graphical user interface 200 of FIG. 2. Additionally or alternatively, the user computing device 102 may present a time series report. The time series report presentation system may communicate with the time series service 100 to retrieve and present time series data.

The time series service 100 can include a communication interface 106, a query executor 108, metadata storage 110, and a backend interface 112. The communication interface 106 can receive time series requests from at least one of the user computing device 102 and/or the library 104. An example library 104 is a software library, such as Python, for performing time series operations. A programmer can write custom time series algorithm using the library 104. The time series requests can be processed by the time series service 100. The query executor 108 can process the requests. Example processing includes generating efficient time series expressions, dynamically converting time series data, identifying which time series databases to query, causing time series data to be populated in one or more time series databases, and/or other operations as described herein. In processing the time series requests, the query executor 108 may access the metadata storage 110, which may store metadata such as the respective units for time series data. The query can execute one or more queries and/or backend requests via the backend interface 112. The backend interface 112 can transmit the generated queries and/or backend requests to the one or more time series databases 132 and/or the data pipeline system 134 and receive responses from the backend systems. In responding to a time series request, the time series service 100 may execute multiple queries, as described herein, to generate the final results for a response. The responses can be transmitted to the communication interface 106, which may further transmit to the user computing device 102 and/or the time series library. Additionally or alternatively, the backend responses may be transmitted to the query executor 108 for further processing before the response data is transmitted to the user computing device 102 and/or the time series library.

In some embodiments, a data pipeline system 134 is a workflow system that can store data in one or more time series databases. For example, the data pipeline system 134 can receive and/or process time series data, such as data collected by one or more sensors. The data pipeline system 134 can access a data source and perform nested transformations to modify and/or format time series data that can be stored in one or more time series databases. As described herein, measurements may be collected from one or more sensors. The data source may have the time series data in a raw format and the data pipeline system 134 can access the data source to process, format the data, and/or store the data into one or more time series databases.

The metadata storage 110 stores metadata regarding time series, such as the units of time series. In some embodiments, a time series database 132 may not include one or more units of a time series. For example, the time series database 132 stores a series of (timestamp, value) pairs, which may not necessarily include data indicative of a particular time unit or other unit for the series. In other embodiments, the time series database 132 may store data indicative of the time unit for a time series. For example, a time series may be stored in the time series database 132 in a particular time unit. In some embodiments, the time series service 100 can include a metadata service (not illustrated in FIG. 1). The metadata service can access the metadata storage 110 to provide metadata regarding one or more time series.

In some embodiments, the alerting service 105 and communicate with the time series service 100. The alerting service 105 can submit time series requests to the time series service 100. The alerting service 105 can repeatedly submit time series requests. The alerting service 105 can include logic to generate alerts if the retrieved time series data satisfies one or more conditions. An example condition includes some of the time series data exceeding a threshold. The alerting service 105 can then generate and/or transmit a corresponding notification. Thus, the time series service 100 acting as a middleware layer can enable improved alerting.

Example Time Series Requests

Figure 2:
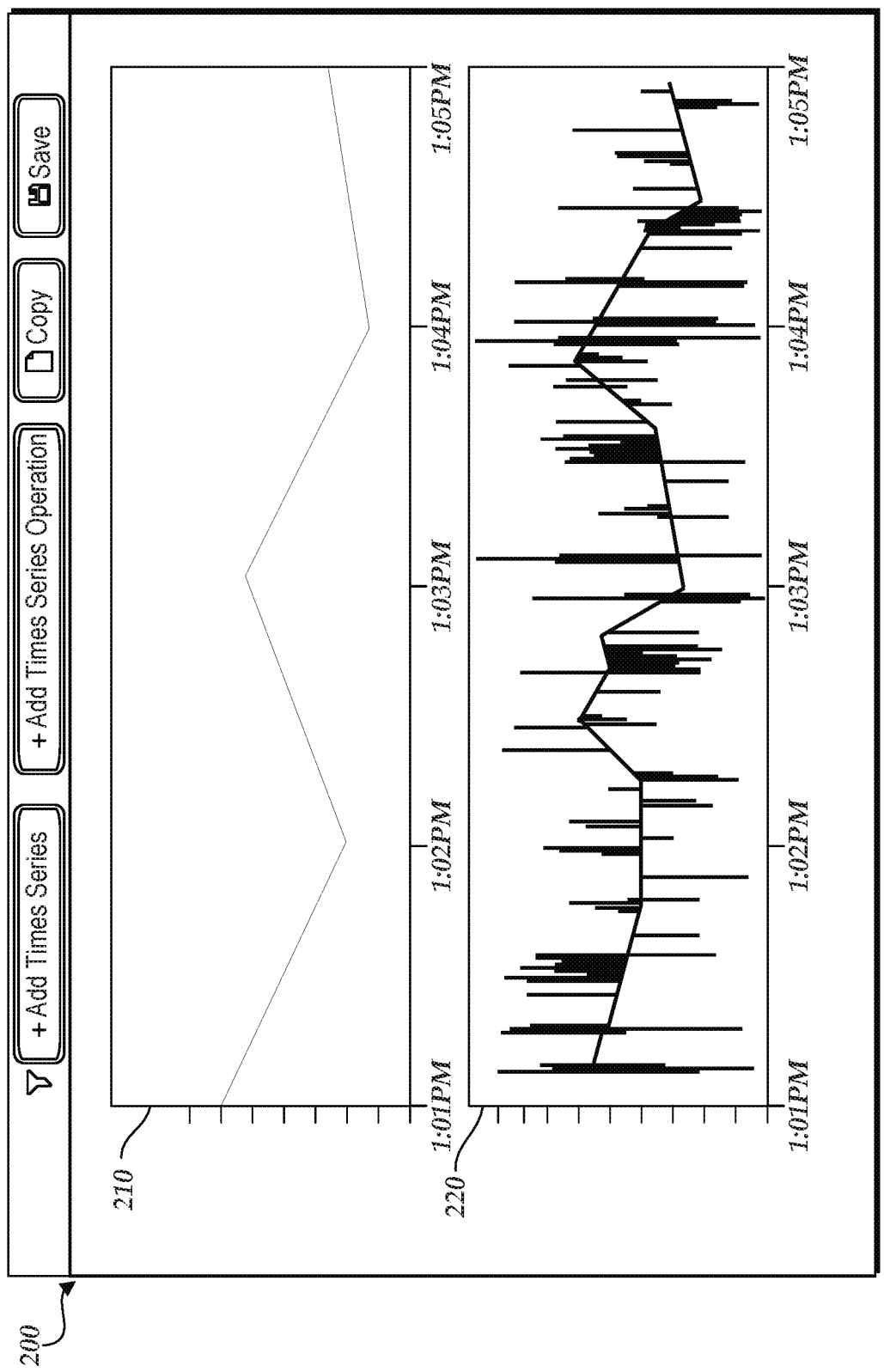
FIG. 2 illustrates an example graphical user interface for presentation and/or interaction with one or more time series, according to some embodiments of the present disclosure.

As described herein, an external device may transmit requests to the time series service 100 through a graphical user interface and/or a library. FIG. 2 illustrates a user interface 200 that depicts graphs of time series data that may be generated and displayed by a computing device, such as the user computing device 102 of FIG. 1. A user interaction with the user interface 200 may cause requests be sent to the time series service 100.

In FIG. 2, the user interface 200 includes a first graph 210 and a second graph 220. The user interface 200 can enable a user to retrieve time series data, query and/or find a time series, view time series data at different periods of time, view time series data at different zoom levels, and/or simultaneously view different time series data over the same time period. In a vehicle sensor context, a user can investigate fuel consumption over time for one or more vehicles using the user interface 200. In the user interface 200, the user can then further zoom in on fuel consumption data generated from a particular fuel pump. Other time series contexts include any situation where a physical device, such as mechanical hardware, can be monitored and measurement data can be collected. An example first graph 210 corresponds to time series data for water allocation values over time. An example second graph 220 corresponds to time series data for temperature values over time.

Figure 3A:
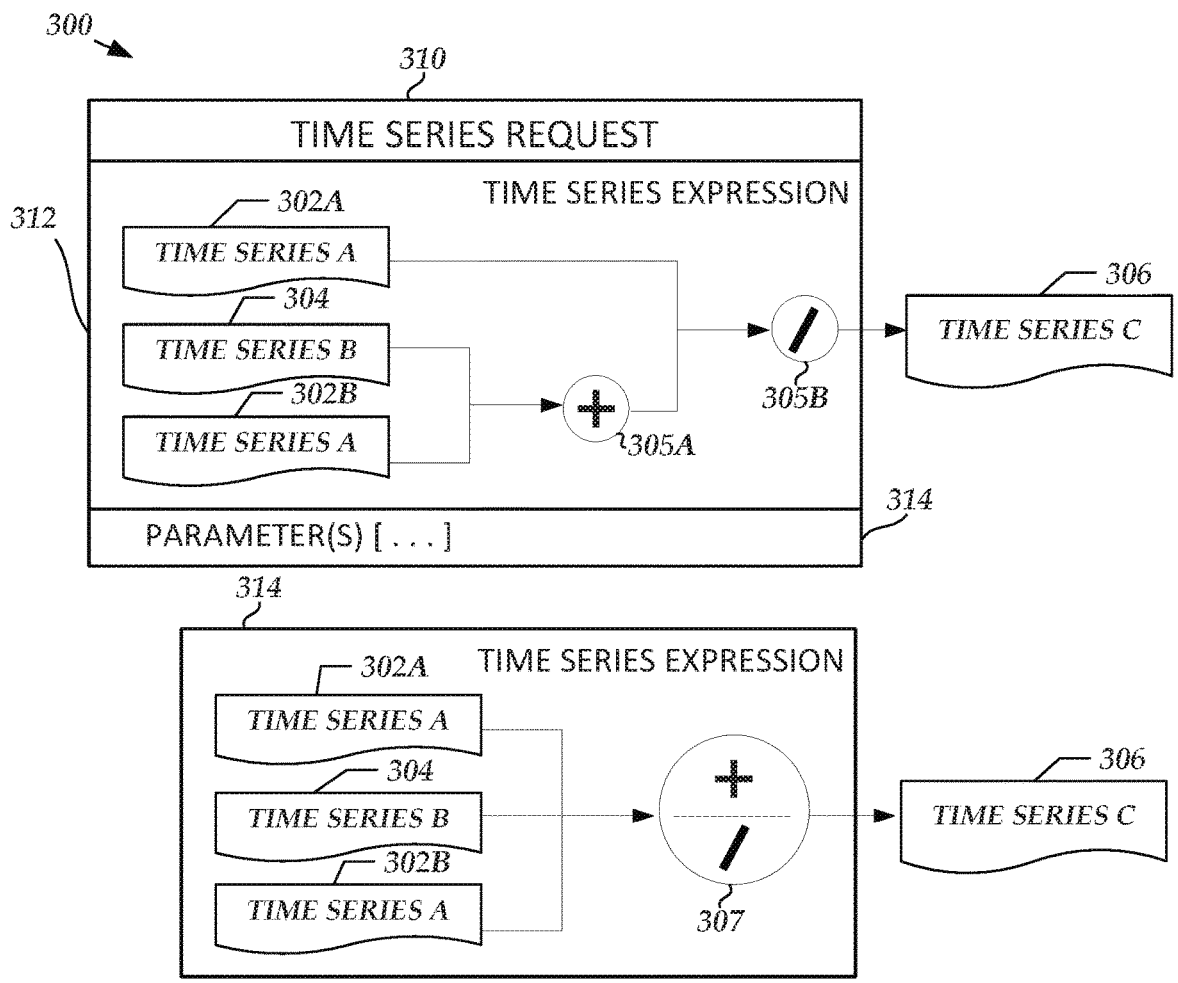
FIGS. 3A-3B illustrate diagrams of example time series requests and time series expressions, according to some embodiments of the present disclosure.
Figure 3B:
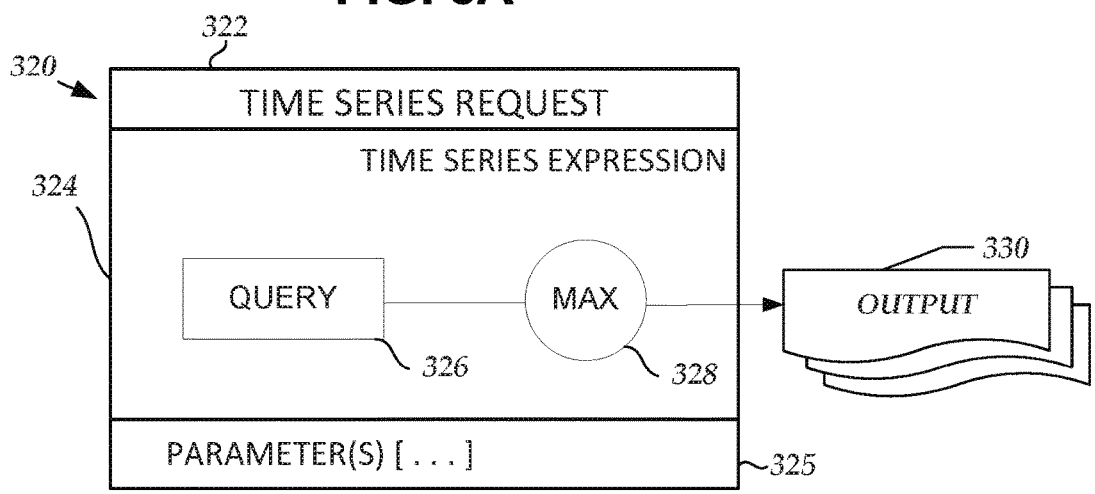

FIGS. 3A-3B illustrate diagrams of example time series requests and time series expressions. In FIG. 3A, the data environment 300 can include a time series request 310 and a generated time series expression 314. The time series requests 310 can be generated and/or sent from the user computing device 102 and/or the library 104 of FIG. 1. The time series request 310 can include a time series expression 312 and one or more parameters 314. As described herein, example one or more parameters 314 are interpolation configuration parameters that indicate a type of interpolation to be performed. Example types of interpolation are described in further detail with respect to FIGS. 5A-5G. The interpolation configuration parameter can instruct how the time series service 100 should perform interpolation. An example, but not limiting, data format for the time series request 310 is a JavaScript Object Notation (JSON) data format.

As illustrated, the time series request 310 and/or the time series expression 312 may be nested. For example, the time series request 310 and/or the time series expression 312 can include two or more nodes that may be linked. The two or more nodes of the time series of request 310 may be in a tree format. Example nodes include nodes that correspond to one or more time series operations, a combined operation, a query, and/or one or more time series, such as one or more time series indicators. Example operations can include mathematical operations, such as, but not limited to, an addition operation, a subtraction operation, a division operation, a multiplication operation, a ratio determination operation, and/or a square root operation; statistical operations, such as, a zScore operation, a standard deviation operation, an average operation, a median operation, a mode of operation, and/or a range operation; and/or other functions including, but not limited to, a maximum operation, a minimum operation, and/or customized functions such as user-defined functions. An example time series indicator can include an identifier, such as a numerical and/or string identifier, that references a particular time series. The time series request 310 can be in a nested JSON data format. The time series expression 312 can describe the request that the time series service 100 may respond to. In some embodiments, the time series service 100 and/or the time series database 132 queries time series data and/or performs one or more operations as represented by the time series expression 312. However, the time series service 100 may optionally generate a new time series expression to be performed instead of the original time series expression since the new time series expression may be more efficient than the original time series expression.

The time series expression 312 can include multiple operations, such as a first operation, a second operation, a third operation, etc. As illustrated, a first operation 305A may be an arithmetic operation and may indicate the addition of data values from a first time series as referenced by the first time series indicator 302B (such as the time series data displayed in the graph 210 of FIG. 2A) with data values from a second time series as referenced by the second time series indicator 304 (such as the time series data displayed in the graph 220 of FIG. 2A). The second operation may be another arithmetic operation 305B and may indicate the division of data values from the first time series as referenced by the time series indicator 302A (such as the time series displayed in the graph 210 of FIG. 2A) over the results from the first operation. A new set of time series data 306 may be the output of the evaluation of the time series expression 312. The time series service 100 may evaluate the time series expression 312 and may return the time series data 306. The time series data 306 may be presented in a user interface, such as the user interface 200 of FIG. 2, such as in one of the graphs 210 or 230, and/or another graph of the user interface 200. While two arithmetic operations are depicted, this is not meant to be limiting. A time series expression may include any number of nested or un-nested operations. Further, while the description of FIG. 3 is sometimes with respect to presented time series data, in other embodiments time series expressions are evaluated on time series data that may not be presented, such as being invoked by a library. In some embodiments, the user may request a display of a graph of time series data that may only be produced by execution of a time series expression on two or more time series. As a result, the time series service 100 may retrieve the necessary time series data, execute the time series expression, and then provide the requested time series data to the device that submitted the request.

In some embodiments, the time series service 100 can rewrite and/or generate a new time series expression from the time series expression that was submitted in the time series request. Execution of a new time series expression may advantageously result in a faster processing time and/or use less computing resources than execution of the originally submitted time series expression. The time series service 100 can use an optimizer to process the submitted time series expression to generate a more efficient time series expression. The time series service 100 can generate a new time series expression using metadata associated with one or more time series referenced in the original time series expression. For example, the metadata may indicate which data sources where the time series data exists and/or can be retrieved.

An example method for generating a more efficient time series expression is to reduce a number of nodes in the time series expression. The time series service 100 can identify two or more nodes in the time series expression that correspond to a time series operation. In the example, the nodes 305A and 305B corresponds to the time series operations of addition and division. The time series service 100 can generate a combined operation node from the identified two or more nodes. An example combined operation node is the node 307, which can represent both the addition and division operations in a single node to the respective input time series. In some embodiments, less nodes in the time series expression may be more efficient for the time series service 100 and/or the backend, such as the one or more time series databases. For example, instead of intermediary processing nodes, the data and/or operations can be pipelined into a node that results in faster processing and/or the use of less computational resources. Further, combining computations, such as arithmetic, into a node may also be further efficient. Accordingly, the time series service can generate the time series expression 314 from the original time series expression 312, which may be rewritten in a form to be more efficient.

FIG. 3B illustrates a diagrams for another time series request. In FIG. 3B, the data environment 320 can include a time series request 322. The time series of request 322 may enable efficient querying of time series data and/or performing one or more operations on the time series data. A time series request may explicitly include references to multiple time series and respective time series expression. However, in some embodiments, instead of including the explicit references to each of multiple time series, a more efficient time series expression may include a node query that can be executed by the time series service 100 to generate a fully planned time series expression.

As described herein, the time series service 100 may be applied in a context where sensors collect time series data. An example context includes time series data collected from vehicles, such as cars, planes, boats, or trucks. In a trucking example, a request may be generally directed towards determining a maximum speed of multiple shipping trucks along a particular shipping route, such as from Los Angeles, Calif. to Portland, Oreg. In one example, a user may use a graphical user interface to pull back a list of deliveries between LA and Portland, which may result in 100 time series being returned to the graphical user interface. Accordingly, while not illustrated, a corresponding time series requests may include a time series expression with 100 time series nodes corresponding to the retrieved 100 time series.

However, in contrast to the previous example, a graphical user interface of FIG. 3B may instead send the time series request 322. The time series request 322 includes a time series expression 324 and one or more parameters 325. As illustrated, instead of including the 100 nodes of the previously example, the time series expression 324 can include a query node 326 and a time series operation node 328. The query node 326 can include instructions that are associated with a particular query. In the example, the query node 326 corresponds to those time series for deliveries between LA and Portland. Example instructions of the query node 326 may correspond to the following pseudocode: "SELECT [TIME SERIES DATA] FROM DELIVERIES WHERE (SOURCE='LOS_ANGELES' AND DESTINATION= 'PORTLAND') OR (SOURCE='PORTLAND' AND DESTINATION='LOS_ANGELES')," which can result in nodes representing the 100 time series described above. Accordingly, the time series service 100 can execute the query node 326 and retrieve the corresponding data instead of having to transmit the initial time series data to the requesting device, which may reduce network bandwidth and/or reduce or offload computer processing from the requesting device. The retrieved corresponding data can include identifiers corresponding to the 100 time series nodes. The time series service 100 and/or a time series database can apply the time series operation corresponding to the node 328 to the results from the query node 326 that generates the output 330. Example output 330 includes one or more data values or time series. In the example, the time series service 100 determines a maximum speed from each of the retrieved 100 time series that results in the output data values 330. Accordingly, the time series service 100 may execute multiple queries against the time series database to respond to a time series request. Thus, the time series service 100 may in effect rewrite the time series expression 324 to be similar to the time series expression 314 of FIG. 3A. For example, the rewritten time series expression may include multiple time series nodes (here, 100 time series nodes) connected to an operation node (here, a maximum node).

Example Time Series Service Process

Figure 4:
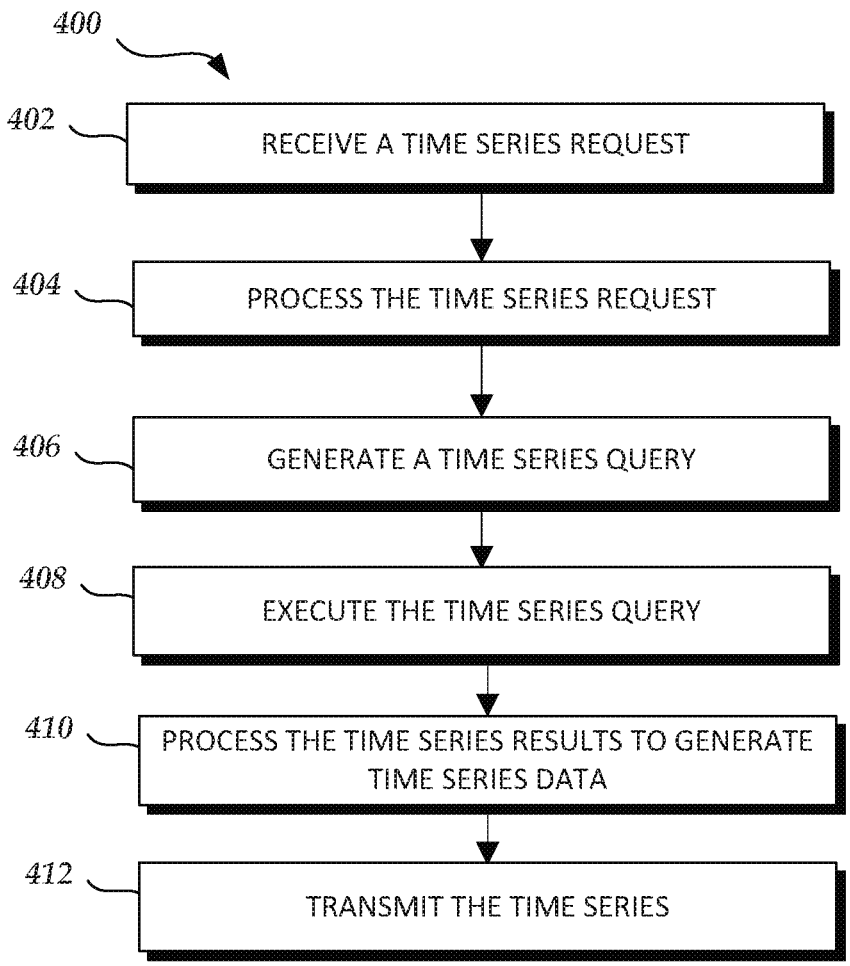
FIG. 4 is a flowchart of a method for processing and responding to time series requests, according to some embodiments of the present disclosure.

FIG. 4 is a flowchart of a method for processing and responding to time series requests, according to some embodiments of the present disclosure. Although the method 400 is described in conjunction with the systems of FIG. 1, any system configured to perform the method, in any order, is within the scope of this disclosure. The method 400 may be performed by the various components of the time series service 100 of FIG. 1 as discussed herein, including the communication interface 106, the query executor 108, and/or the backend interface 112. Depending on the embodiment, the method 400 may include fewer or additional blocks and/or the blocks may be performed in an order different than is illustrated. Blocks of the method 400 may be similar to blocks of any other method described herein. The techniques and/or algorithms of a block of the method 400 may describe the techniques and/or algorithms that can be used at a block of any other the method described herein. Additionally or alternatively, the method 400 may be combined with any other method described herein.

Beginning at block 402, the communication interface 106 receives a time series requests. As described herein, a time series requests may be received from a user computing device 102 and/or a library 104. An example library is a software library that can communicate with the time series service. In some embodiments, the communication interface 106 implements an Application Programming Interface (API) to receive requests. A time series requests can include one or more times series identifiers, one or more operations, a time series expression, and/or other parameters.

At block 404, the query executor 108 processes the time series of request. Processing of the time series of request can include the query executor 108 retrieving metadata from the metadata storage 110 for the one or more time series identified in the request. Additional or alternative processing of the time series of request can include identifying where the time series data is located and/or causing the time series data to be populated in a data source, as described in further detail herein.

At block 406, the query executor 108 generates a time series query. The time series query can include a time series expression. The query executor 108 can generate a new time series expression from the time series expression from the request. The query executor 108 may use some of the results from the previous block 404 to generate the time series query. For example, the query executor 108 can use the time series metadata, such as a respective time unit, to generate the time series query. In another example, the query executor 108 can specify the data source to query the time series data based on one or more factors: such as the presence or existence of the time series in the data source and/or a determination that multiple time series are located in a particular data source. The query executor 108 may further generate an efficient query, as described in further detail herein.

At block 408, the query executor 108 executes the generated time series query via the backend interface 112. The backend interface 112 can execute the time series query and can retrieve time series data.

At block 410, the query executor 108 processes the time series results to generate time series data. Example processing of results by the query executor 108 includes applying operations to the retrieved results, such as applying one or more arithmetic operations. In other embodiments, the time series database performs one or more operations. The query executor 108 can process time unit conversions of time series data sets of different time units. The query executor 108 can interpolate time series data, such as when time series data is combined according to a time series expression. The query executor 108 can process the times series results to generate time series data, such as a data value and/or a new time series. In some embodiments, the time series service 100 supports storing the generated time series data with an identifier. Accordingly, a subsequent time series request can include the identifier to reference the stored time series data.

At block 412, the communication interface 106 transmits the time series data. In some embodiments, the transmission of the time series occurs via the API.

Example Time Series Interpolation And/or Normalization Processes

The time series data in the time series database 132 may not be in a state where the time series expression can be applied. Thus, the time series service 100 can generate new data from the existing time series data where the new data is in a state that is compatible with the time series expression. The time series service 100 can perform interpolation. As used herein, in addition to having its ordinary and customary meaning and/or any other implied meaning and in addition to being construed broadly, the term "interpolation" refers to the generation of a set of values from a first set of values. Interpolation can include an estimation of a value within two known values in a sequence of values. Interpolation can further include determining a subset of values from a set of values. As described herein, a first set of values for a first time series may be incompatible with a second set of values for a second time series. For example, there may be more values in the second set than the first set. Thus, the time series service 100 can perform an example method interpolation by determining a subset of the second set of values that is compatible with the first set of values. The time series service 100 can perform data normalization. A first set of values for a first time series may be incompatible with a second set of values for a second time series based on the time unit of each respective time series. The time series service 100 can perform an example method data normalization by applying a scaling factor to one or more of the time series.

Figure 5A:
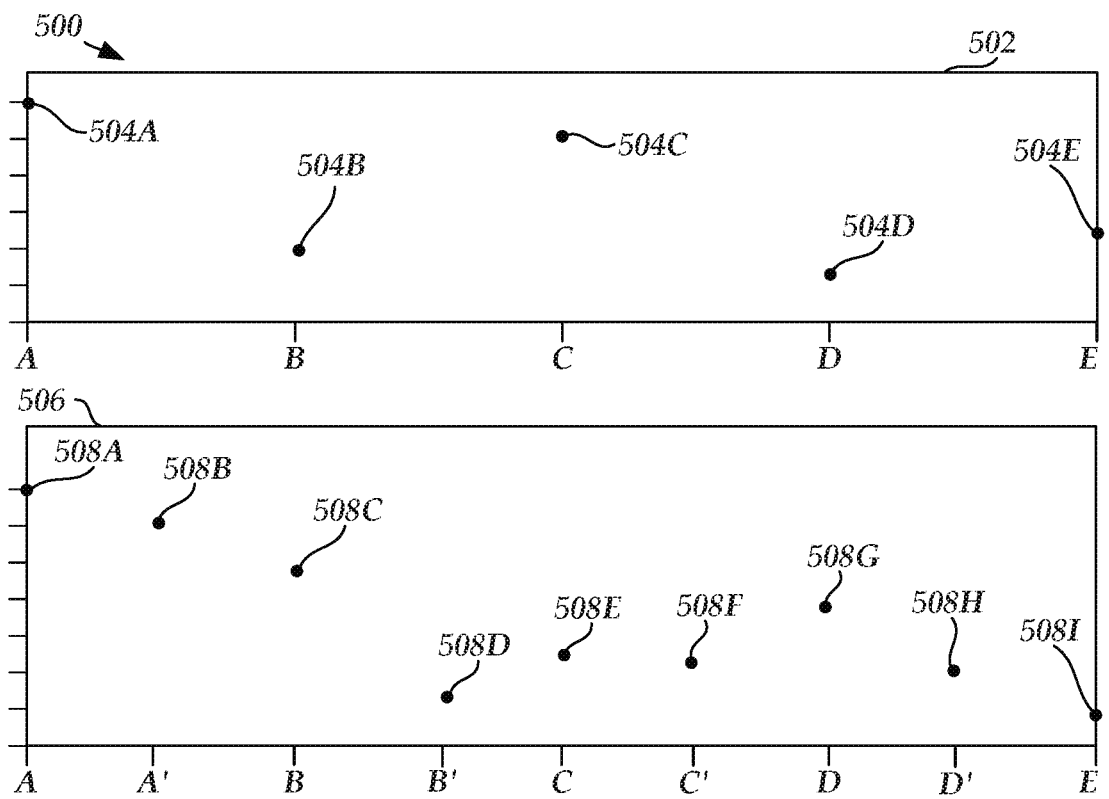
FIGS. 5A-5I illustrate example time series data, time series interpolation, and/or time series normalization, according to some embodiments of the present disclosure.

FIGS. 5A-5G illustrate example time series data and/or time series interpolation. In FIG. 5A, the data environment 500 includes a first time series 502 and a second time series 506. The first time series 502 includes at least the data values 504A, 504B, 504C, 504D, and 504E at the timestamps A, B, C, D, and E, respectively. The timestamps A, B, C, D, and E of the first time series 502 and/or the timestamps of the second time series 506 can correspond to hours, minutes, seconds, milliseconds, microseconds, nanoseconds, or any other time unit or interval. The second time series 506 includes at least the data values 508A, 508B, 508C, 508D, 508E, 508F, 508G, 508H, and 508I at the timestamps A, A', B, B', C, C', D, D', and E. As shown in FIG. 5A, the timestamps A, A', B, B', C, C', D, D', and E represent any kind of timestamp and do not correspond to any specific timestamp format. For example, the timestamp A can correspond to a first millisecond and the timestamp A' can correspond to a second millisecond. In another example, the timestamp A can correspond to a time 0 and the timestamp A' can correspond to a 0.5 seconds.

As described herein, the time series service 100 processes requests that can include time series expressions referencing one or more times series. Thus, a time series expression can include references to the first time series 502 and the second time series 506 to perform an operation on the times series 502 and 506. However, the second time series 506 as shown may include more data values than the first time series 502. Accordingly, the time series service 100 may modify one or more of the time series 502 and 506 for the one or more time series to be in a compatible format for one or more operations.

In FIG. 5A, the stored timestamps of the first time series 502 can be in a first time unit, such as, but not limited to, hours, minutes, seconds, milliseconds, microseconds, nanoseconds. The stored timestamps second time series 506 can be in a second time unit, which can be different from the first time unit. In other embodiments, the first time series 502 is stored at a first frequency, such as 50 hertz or 50 times per second, and the second time is stored at a second frequency, such as 100 hertz or 100 times per second. The second time unit or the second frequency can be more granular than the first time unit. For example, the first time unit can be seconds and the second time unit can be milliseconds or microseconds. Thus, the second time series 506 can include more data values than the first time series 502, since the data of the second time series 506 was recorded at a greater granularity. In other embodiments, the respective time units of the time series 502 and 506 may be the same, but the frequency of recordation of the second time series 506 may be greater than the frequency of recordation for the first time series 502. For example, the second time series 506 may include data values at 2 second intervals in contrast to the first time series 502 that may include data values at 1 second intervals.

Figure 5B:
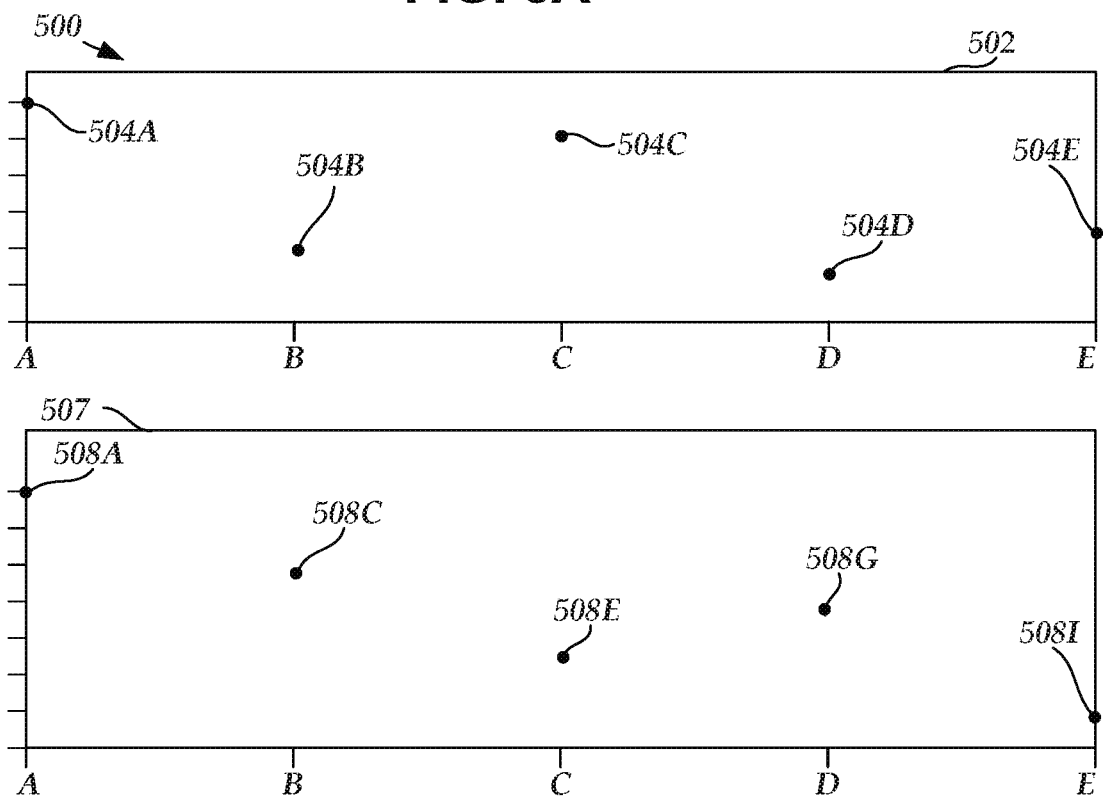

FIG. 5B illustrates additional time series data. In FIG. 5B, the data environment 500 includes the first time series 502 and another time series 507. Some of the time series data of FIG. 5B may be similar to the time series data of FIG. 5A. For example, the first time series 502 of FIG. 5B may be the same as the first time series of FIG. 5A. The time series 507 may represent a data set that is generated from the time series 506 of FIG. 5B. The time series 507 can include the data values 508A, 508C, 508E, 508G, and 508I, and may not include the data values 508B, 508D, 508F, and 508H of the time series 506 of FIG. 5B. Further, the data values 508A, 508C, 508E, 508G, and 508I of the time series 506 may match up with the data values 504A, 504B, 504C, 504D, and 504E at the same respective timestamps. Thus, the time series service 100 may perform an operation, such as an addition, divide, or average function, for example, on the time series 502 and the time series 506 since those time series may have values at the same respective timestamps.

The time series service 100 may use one or more methods to generate the time series 507 from the time series 506 of FIG. 5B. In some embodiments, the respective time units of the times series 502 and the time series 506 of FIG. 5A may be stored as metadata. For example, the first time series 502 can include first timestamps that correspond to a first time unit, such as seconds, and the second time series 506 can include second timestamps that correspond to a second time unit, such as milliseconds. First metadata may include a first association between the first time series 502 and the first time unit, such as seconds. Second metadata may include a second association between the second time series 506 and the second time unit, such as milliseconds.

The time series service 100 can determine, using the first metadata and the second metadata, that the first time unit and the second time unit are different. In the example, the first time series 502 includes timestamps that correspond to seconds and the second time series 506 includes timestamps that correspond to milliseconds, which are different time units. The time series service 100 can determine that the second time unit is more granular than the first time unit. In the example, the time series service 100 determines that the second time unit (milliseconds) of the second time series 506 is more granular than the first time unit (here seconds) of the first time series 502.

The time series service 100 can identify a first set of timestamps from the first time series and a second set of timestamps from the second time series. In the example, the time series service 100 identifies the first set of timestamps (A, B, C, D, and E) from the first time series 502 and a second set of timestamps (A, A', B, B', C, C', D, D', and E) from the second time series 506. The time series service 100 can identify, from the second set of timestamps, a second subset of timestamps that correspond to a granularity of the first time unit. In the example, the second set of timestamps (A, A', B, B', C, C', D, E', and E) that correspond to the first time unit (here seconds) is the second subset of timestamps (A, B, C, D, and E). In the example, the timestamp A can correspond to zero milliseconds, the timestamp A' can correspond to a millisecond between 0 and 1000 milliseconds, and the timestamp B can correspond to 1000 milliseconds (1 second). Thus, the second subset of timestamps (A, B, C, D, and E) does not include the timestamp A' because it is a time between 0 and 1000 milliseconds and does not correspond to a granularity of the first time unit (here seconds).

The time series service 100 can generate, from the first time series and the first set of timestamps, a first data set. In the example, the time series service 100 generates a first data set that includes the data values 504A, 504B, 504C, 504D, and 504E that correspond to the first set of timestamps A, B, C, D, and E. The time series service 100 can generate, from the second time series and the second subset of timestamps, a second interpolated data set. In the example, the time series service 100 generates a second interpolated data set that includes the data values 508A, 508C, 508E, 508G, and 508I of FIG. 5B that correspond to the second subset of timestamps A, B, C, D, and E. Thus, the time series service 100 can perform an operation on the first data set and the second interpolated data set since each respective data set has data values that correspond to the same timestamps A, B, C, D, and E. Further, as shown in FIG. 5B, the interpolate time series 507 does not include data values for the timestamps A', B', C', and D', since those timestamps were not of the same granularity as the first time unit of the first time series 502.

In other embodiments, the time series service 100 can use other methods to interpolate data. The time series service 100 can dynamically determine common timestamps to generate interpolated data. The time series service 100 can compare the timestamps of a first time series and the timestamps of a second time series to determine common timestamps. For example, the time series service 100 can compare the timestamps (A, B, C, D, and E) of the first time series 502 to the timestamps (A, A', B, B', C, C', D, D', and E) of the second time series 506 of FIG. 5A. In the example comparison, the common timestamps between the time series 502 and 506 are the timestamps (A, B, C, D, and E). The time series service 100 can generate new time series data from the common timestamps. For example, as shown in FIG. 5B, the time series data 507 includes the data values 508A, 508C, 508E, 508G, and 508I that correspond to the common timestamps (A, B, C, D, and E). Further, in the time series 507, the data values 508B, 508D, 508F, and 508H of the time series 506 of FIG. 5B are not present. Thus, the time series service 100 may perform an operation on the time series 502 and 507 since the time series 502 and 507 include common timestamps.

FIGS. 5C-5G illustrate additional example time series data. Further, the time series service 100 can use one or more methods to generate the interpolated data of FIGS. 5D, 5E, 5F, and/or 5G. The one or more interpolation methods can include one or more interpolation operations, such as, a "none" interpolation operation, a "nearest" interpolation operation, a "previous" interpolation operation, a "next" interpolation operation, a linear interpolation operation, and/or a polynomial interpolation operation. The interpolation shown in FIGS. 5A to 5B may correspond to a "none" interpolation operation.

The one or more interpolation methods of the time series service 100 can apply different interpolation operations in different situations. The time series service 100 can apply different interpolation operations based on a position of a timestamp for a to-be-generated interpolated data value relative to one or more timestamps for existing data values. In some embodiments, the time series service 100 can apply different interpolation operations at a "before" or first phase of interpolation, at an "internal" or second phase of interpolation, and at an "after" or third phase of interpolation.

At the "before" or first phase of interpolation, the time series service 100 can at least apply the "nearest" interpolation operation or the "none" interpolation operation. The "before" or first phase of interpolation may correspond to any timestamp that is before a first existing timestamp, where the first existing timestamp is the earliest timestamp in an existing time series.

At the "internal" or second phase of interpolation, the time series service 100 can at least apply the "none" interpolation operation, a "nearest" interpolation operation, a "previous" interpolation operation, a "next" interpolation operation, or a linear interpolation operation. Additionally or alternatively, the time series service 100 can apply a polynomial interpolation operation during the "internal" or second phase of interpolation. The "internal" or second phase of interpolation may correspond to any timestamp between the first existing timestamp and a last existing timestamp, where the last existing timestamp is the oldest timestamp in an existing time series.

At the "after" or third phase of interpolation, the time series service 100 can at least apply the "nearest" interpolation operation or the "none" interpolation operation. The "after" or third phase of interpolation may correspond to any timestamp that is after the last existing timestamp.

Figure 5C:
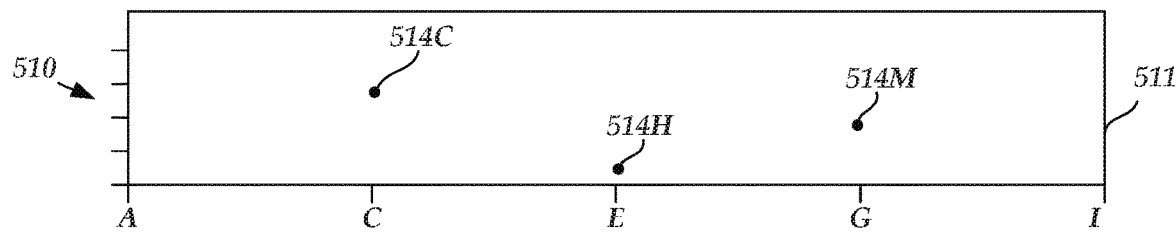

In FIG. 5C, the data environment 510 includes a time series 511. The time series 511 includes at least the data values 514C, 514H, and 514M at the timestamps C, E, and G, respectively. The time series 511 of FIG. 5C may be similar to the time series 502 of FIG. 5A in some respects. In FIG. 5C, the time series service 100 may apply an operation from a time series expression to the time series 511 and at least one other time series (not illustrated), which may be similar to the illustrated situation of FIGS. 5A-5B. Thus, the time series service 100 may apply one or more interpolation techniques that result in the generation of interpolated data as shown in one of FIG. 5D, 5E, 5F, or 5G.

Figure 5D:
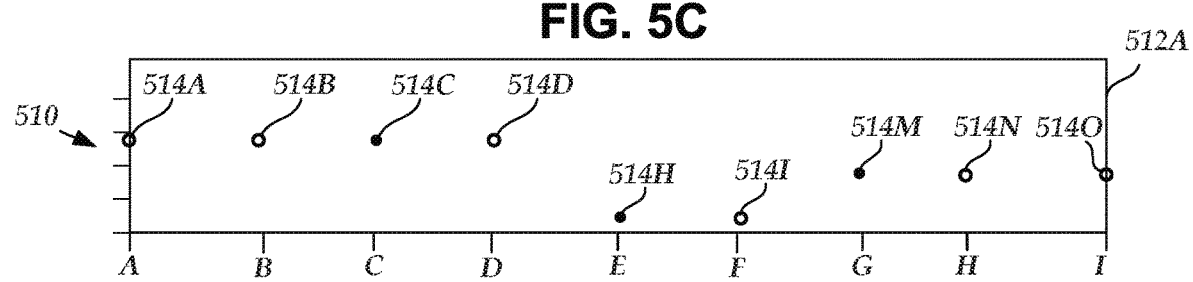

In FIG. 5D, the data environment 510 includes a generated time series 512A. The time series 512A of FIG. 5D may be similar to the time series 511 of FIG. 5C in some respects. Further, the time series service 100 can generate the time series 512A of FIG. 5D from the time series 511 of FIG. 5C. The time series 512A includes at least the data values 514A, 514B, 514C, 514D, 514H, 514I, 514M, 514N, and 514O at the timestamps A, B, C, D, E, F, G, H, and I, respectively. The data values 514A, 514B, 514D, 514I, 514N, and 514O at the timestamps A, B, D, F, H, and I, respectively, may be interpolated data values.

In FIG. 5D, the interpolated data values 514A and 514B at the timestamps A and B, respectively, may correspond to the "before" or first phase of interpolation. The timestamps A and B are before the first existing timestamp 00:03 from the time series 511 of FIG. 5C. Accordingly, the time series service 100 can apply the "nearest" interpolation operation to generate the interpolated data values 514A and 514B. In applying the "nearest" interpolation operation, the time series service 100 identifies the nearest existing data value and generates an interpolated data value from the nearest existing data value. An example method of generating a nearest interpolated data value is copying the nearest data value. In the example of FIG. 5D, the time series service 100 identifies the data value 514C at timestamp C as the nearest existing data value for the timestamps A and B. The time series service 100 can copy the data value 514C to generate the interpolated data values 514A and 514B.

The interpolated data values 514D and 514I at the timestamps D and F, respectively, may correspond to the "internal" or second phase of interpolation. The timestamps D and F are between the first existing timestamp C and the last existing timestamp G from the time series 511 of FIG. 5C. Accordingly, the time series service 100 can apply the "previous" or "nearest" interpolation operation to generate the interpolated data values 514D and 514I. In some embodiments, for the "nearest" interpolation operation, if there is more than one data value that is equally near a particular timestamp, then the time series service 100 can pick the earliest data value, the latest data value, and/or pseudo-randomly choose a data value from multiple data values. In applying the "previous" interpolation operation, the time series service 100 identifies the previous existing data value and generates an interpolated data value from the previous existing data value. An example method of generating an interpolated data value using the "previous" interpolation operation is copying the previous data value. In the example of FIG. 5D, the time series service 100 identifies the data value 514C at timestamp C as the previous existing data value for the timestamp D. The time series service 100 can copy the data value 514C to generate the interpolated data value 514D. Similarly, the time series service 100 can copy the data value 514H to generate the interpolated data value 514I since the data value 514H at timestamp E may be the previous existing data value with respect to the timestamp F.

In FIG. 5D, the interpolated data values 514N and 514O at the timestamps H and I, respectively, may correspond to the "after" or third phase of interpolation. The timestamps H and I are after the last existing timestamp G from the time series 511 of FIG. 5C. Accordingly, the time series service 100 can apply the "nearest" interpolation operation to generate the interpolated data values 514N and 514O. In the example, the time series service 100 identifies the data value 514M at timestamp G as the nearest existing data value for the timestamps H and I. The time series service 100 can copy the data value 514M to generate the interpolated data values 514N and 514O.

Figure 5E:
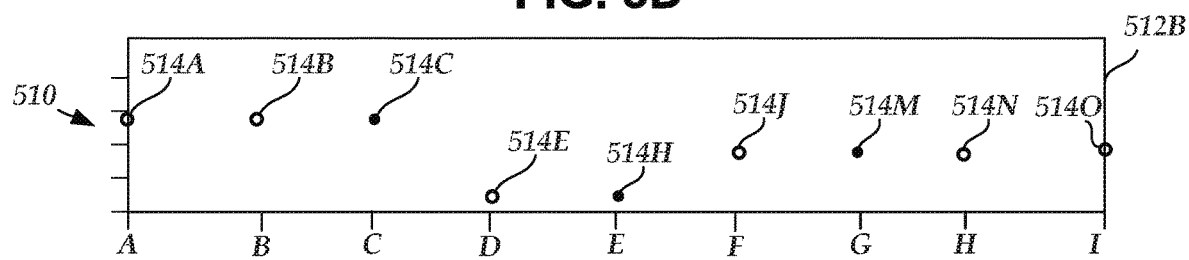

In FIG. 5E, the data environment 510 includes a generated time series 512B. The time series 512B of FIG. 5E may be similar to the time series 511 of FIG. 5C in some respects. Further, the time series service 100 can generate the time series 512B of FIG. 5E from the time series 511 of FIG. 5C. The time series 512B includes at least the data values 514A, 514B, 514C, 514E, 514H, 514J, 514M, 514N, and 514O at the timestamps A, B, C, D, E, F, G, H, and I, respectively. The data values 514A, 514B, 514E, 514J, 514N, and 514O at the timestamps A, B, D, F, H, and I, respectively, may be interpolated data values. Further, the method of generating the interpolated data values 514E and 514J may be different than an interpolation method described with respect to FIGS. 5A-5B or 5C-5D.

In FIG. 5E, the interpolated data values 514A and 514B at the timestamps A and B, respectively, may correspond to the "before" or first phase of interpolation. Accordingly, the time series service 100 can apply the "nearest" interpolation operation to generate the interpolated data values 514A and 514B in FIG. 5E. The application of the "nearest" interpolation operation in FIG. 5E, such as with respect to the "before" or first phase, may be similar to the application of the "nearest" interpolation operation in FIG. 5D.

The interpolated data values 514E and 514J at the timestamps D and F, respectively, may correspond to the "internal" or second phase of interpolation. Accordingly, the time series service 100 can apply the "next" or "nearest" interpolation operation to generate the interpolated data values 514E and 514J. In applying the "next" interpolation operation, the time series service 100 identifies the next existing data value and generates an interpolated data value from the next existing data value. An example method of generating an interpolated data value using the "next" interpolation operation is copying the next data value. In the example of FIG. 5E, the time series service 100 identifies the data value 514H at timestamp E as the next existing data value for the timestamp D. The time series service 100 can copy the data value 514H to generate the interpolated data value 514E. Similarly, the time series service 100 can copy the data value 514M to generate the interpolated data value 514J since the data value 514M at timestamp G may be the next existing data value with respect to the timestamp F.

In FIG. 5E, the interpolated data values 514N and 514O at the timestamps H and I, respectively, may correspond to the "after" or third phase of interpolation. Accordingly, the time series service 100 can apply the "nearest" interpolation operation to generate the interpolated data values 514N and 514O. The application of the "nearest" interpolation operation in FIG. 5E, such as with respect to the "after" or third phase, may be similar to the application of the "nearest" interpolation operation in FIG. 5D.

Figure 5F:
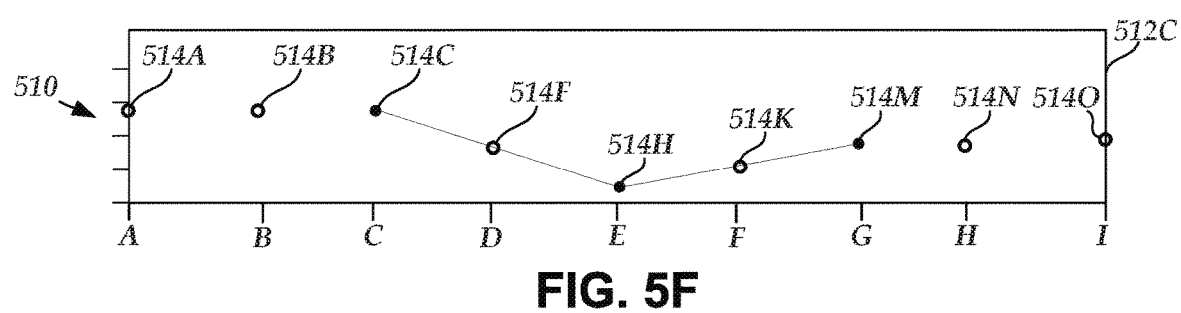

In FIG. 5F, the data environment 510 includes a generated time series 512C. The time series 512C of FIG. 5F may be similar to the time series 511 of FIG. 5C in some respects. Further, the time series service 100 can generate the time series 512C of FIG. 5F from the time series 511 of FIG. 5C. The time series 512C includes at least the data values 514A, 514B, 514C, 514F, 514H, 514K, 514M, 514N, and 514O at the timestamps A, B, C, D, E, F, G, H, and I, respectively. The data values 514A, 514B, 514F, 514K, 514N, and 514O at the timestamps A, B, D, F, H, and I, respectively, may be interpolated data values. Further, the method of generating the interpolated data values 514F and 514K may be different than an interpolation method described with respect to FIGS. 5A-5B or 5C-5E.

In FIG. 5F, the interpolated data values 514A and 514B at the timestamps A and B, respectively, may correspond to the "before" or first phase of interpolation. Accordingly, the time series service 100 can apply the "nearest" interpolation operation to generate the interpolated data values 514A and 514B in FIG. 5E. The application of the "nearest" interpolation operation in FIG. 5E, such as with respect to the "before" or first phase, may be similar to the application of the "nearest" interpolation operation in FIG. 5D.

The interpolated data values 514F and 514K at the timestamps D and F, respectively, may correspond to the "internal" or second phase of interpolation. Accordingly, the time series service 100 can apply a linear interpolation operation or calculation to generate the interpolated data values 514F and 514K. In applying the linear interpolation operation or calculation, the time series service 100 identifies the previous existing data value and the next existing data value with respect to a timestamp and generates an interpolated data value from the previous existing data value and the next existing data value. An example method of generating an interpolated data value using the linear interpolation operation or calculation determining a linear function that corresponds to the previous existing data value and the next existing data value. An example linear function is the equation y=mx+b, which can be determined from the (x1,y1) coordinate for the previous existing data value and the (x2,y2) coordinate for the next existing data value. In some embodiments, the slope can be determined from the equation that corresponds to m=(y2−y1)/(x2−x1) and b, the y-intercept, can be determined using algebra.

In the example of FIG. 5F, the time series service 100 identifies the data value 514C at timestamp C as the previous existing data value for the timestamp D and the data value 514H at timestamp E as the next existing data value for the timestamp D. The time series service 100 can determine a line or linear equation (y=mx+b) using the existing data values 514C and 514H. Using the line or linear equation, the time series service 100 can determine the interpolated data value 514F using the line or linear equation (y=mx+b) where m and b have previously been determined and the input value for x is in the timestamp D. Accordingly, as shown in FIG. 514F, the data value or point 514F is on the straight line between the data values or points 514C and 514H. Similarly, the time series service 100 can use a linear interpolation operation or calculation to generate the interpolated data value 514K at timestamp F based on the existing data values for the timestamps E and G.

Figure 5G:
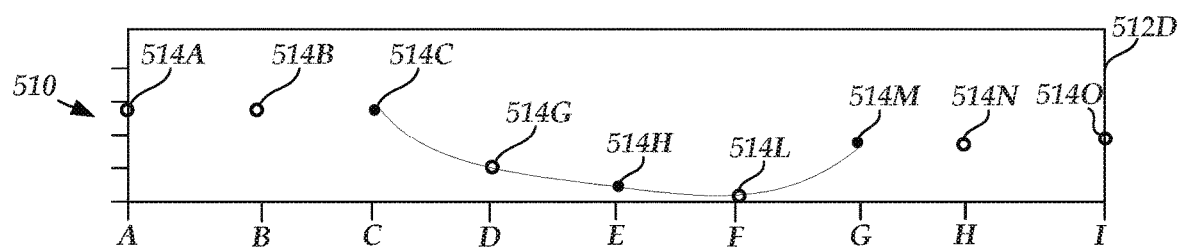

In FIG. 5G, the data environment 510 includes a generated time series 512D. The time series 512C of FIG. 5G may be similar to the time series 511 of FIG. 5C in some respects. Further, the time series service 100 can generate the time series 512D of FIG. 5G from the time series 511 of FIG. 5C. The time series 512C includes at least the data values 514A, 514B, 514C, 514G, 514H, 514L, 514M, 514N, and 514O at the timestamps A, B, C, D, E, F, G, H, and I, respectively. The data values 514A, 514B, 514G, 514L, 514N, and 514O at timestamps A, B, D, F, H, and I, respectively, may be interpolated data values. The method of generating the interpolated data values 514G and 514L may be different than an interpolation method described with respect to FIGS. 5A-5B or 5C-5F. However, the method for generating the data values 514A and 514B with respect to a "before" or first phase of interpolation and/or the data values 514N and 514O with respect to an "after" or third phase of interpolation may be similar to the methods of respective phases of FIG. 5D as described above.

The interpolated data values 514G and 514L at the timestamps D and F, respectively, may correspond to the "internal" or second phase of interpolation. Accordingly, the time series service 100 can apply a polynomial interpolation operation or calculation to generate the interpolated data values 514G and 514L. In applying the polynomial interpolation operation or calculation, the time series service 100 identifies the multiple existing data values and generates an interpolated data value from the multiple existing data values. A polynomial can be a mathematical expression comprising a sum of terms, each term including a variable or variables raised to a power and multiplied by a coefficient. The curved lines connecting the data values 514C, 514H, and 514M are illustrated to generally represent a polynomial function and may not be exactly illustrated to represent a particular polynomial function of the illustrated data values. One or more known techniques may be used to generate or determine a polynomial function based on multiple known and existing data values, which can then be used to generate an interpolated data value.

Figure 5H:
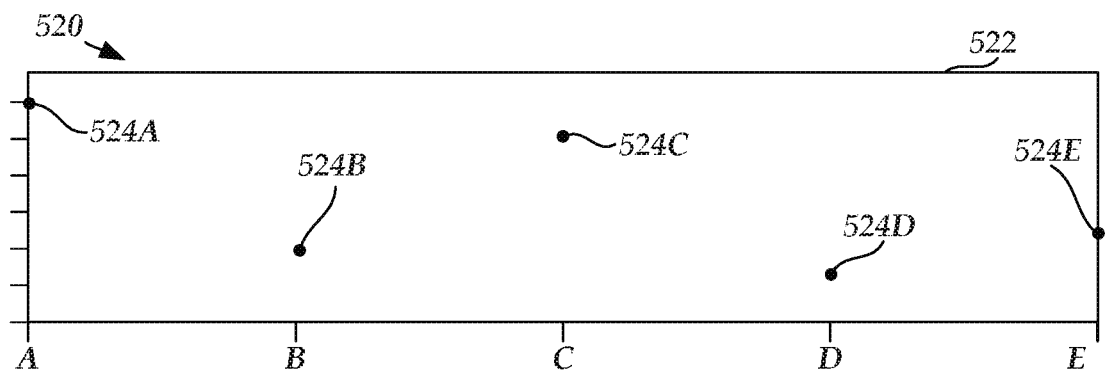
Figure 5I:
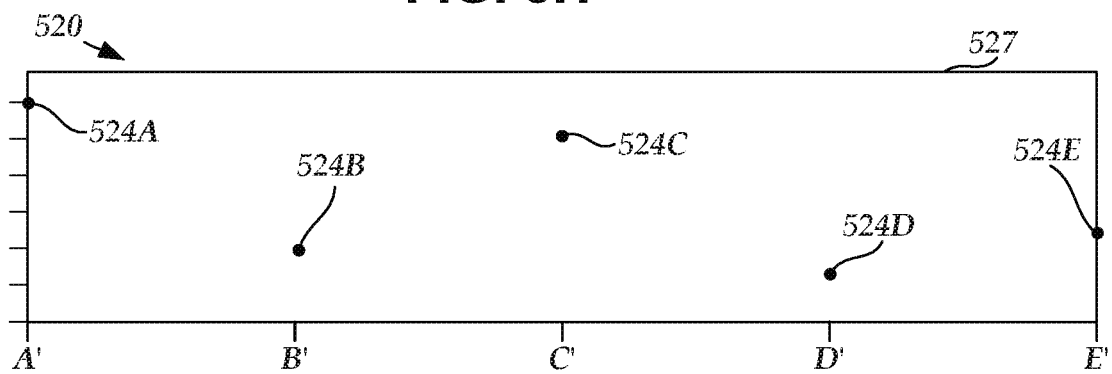

FIGS. 5H and 5I illustrate example time series data and/or time series normalization. In FIG. 5H, the data environment 520 includes a first time series 522 and a second time series 526. The first time series 502 includes at least the data values 524A, 524B, 524C, 524D, and 524E at the timestamps A, B, C, D, and E, respectively. The timestamps A, B, C, D, and E of the first time series 522 and/or the timestamps of the second time series 526 can be stored as an integer, such as a long integer. As described herein, the first time series 522 and the second time series 526 may have metadata that indicates that the respective time series is stored in a particular time unit, such hours, minutes, seconds, milliseconds, microseconds, nanoseconds, or any other time unit or interval. The second time series 506 includes at least the data values 508A, 508B, 508C, 508D, 508E, 508F, 508G, 508H, and 508I at the timestamps F, G, H, I, and J. As shown in FIG. 5A, the timestamps A, B, C, D, E, F, G, H, I, and J represent any kind of timestamp and do not correspond to any specific timestamp format. In the example, A, B, C, D, and E can correspond to the values 1, 2, 3, 4, and 5, respectively (for a time series stored in seconds); F, G, H, I, and J can correspond to the values 1000, 2000, 3000, 4000, and 5000, respectively (for a time series stored in milliseconds).

As described herein, the time series service 100 processes requests that can include time series expressions referencing one or more times series. Thus, a time series expression can include references to the first time series 522 and the second time series 526 to perform an operation on the times series 502 and 506. However, the first time series 522 and the second time series 526 may be stored in different time units such that the time series are incompatible for performing operations on both of the time series. Accordingly, the time series service 100 may modify one or more of the time series 502 and 506 for the one or more time series to be in a compatible format for one or more operations.

FIG. 5I illustrates additional time series data. In FIG. 5I, the data environment 500 includes a generated time series 527 and the second time series 526. Some of the time series data of FIG. 5H may be similar to the time series data of FIG. 5I. For example, the second time series 526 of FIG. 5H may be the same as the second time series of FIG. 5I. The generated time series 527 may represent a data set that is generated from the time series 526 of FIG. 5H. The generated time series 527 can include the data values 524A, 524B, 524C, 524D, and 524E at the timestamps A', B', C', D', and E'. Further, the timestamps A', B', C', D', and E' of the generated time series 527 may be in the same time unit as the timestamps F, G, H, I, and J of the second time series 526. Thus, the time series service 100 may perform an operation, such as an addition, divide, or average function, for example, on the generated time series 526 and the second time series 526 since those time series may have timestamps that are stored in a common time unit.

The time series service 100 may use one or more methods to generate the time series 527 from the time series 526 of FIG. 5H. In some embodiments, the respective time units of the times series 522 and the time series 526 of FIG. 5H may be stored as metadata. For example, the first time series 522 can include first timestamps that correspond to a first time unit, such as seconds, and the second time series 526 can include second timestamps that correspond to a second time unit, such as milliseconds. First metadata may include a first association between the first time series 522 and the first time unit, such as seconds. Second metadata may include a second association between the second time series 526 and the second time unit, such as milliseconds.

The time series service 100 can determine, using the first metadata and the second metadata, that the first time unit and the second time unit are different. In the example, the first time series 522 includes timestamps that correspond to seconds and the second time series 526 includes timestamps that correspond to milliseconds, which are different time units. The time series service 100 can determine that the second time unit is more granular than the first time unit. In the example, the time series service 100 determines that the second time unit (milliseconds) of the second time series 526 is more granular than the first time unit (here seconds) of the first time series 522.

The time series service 100 can generate, from the first time series and the first set of timestamps, a first data set. The time series service 100 can determine a conversion operation. Example conversation operations include functions, such as a scaling function. In the example, the time series service 100 determines a scaling function to convert from a first time unit to a second time unit, which can include multiplying or dividing the first set of timestamps by a constant to generate a second set of timestamps. In the example to convert from seconds to milliseconds, the time series service 100 determines a scaling function to multiply each timestamp of the first set of timestamps by the constant 1000 to generate a second set of timestamps in milliseconds. As shown in FIG. 5I, the second set of timestamps A', B', C', D', and E' (e.g., 1000, 2000, 3000, 4000, and 5000) are generated by applying a conversation operation, such as a scaling function (e.g., multiplying by 1000), to the first set of timestamps A, B, C, D, and E (e.g., 1, 2, 3, 4, and 5). In FIG. 5I, the resulting time series 527 may be in a common time unit as the time series 526.

Figure 6:
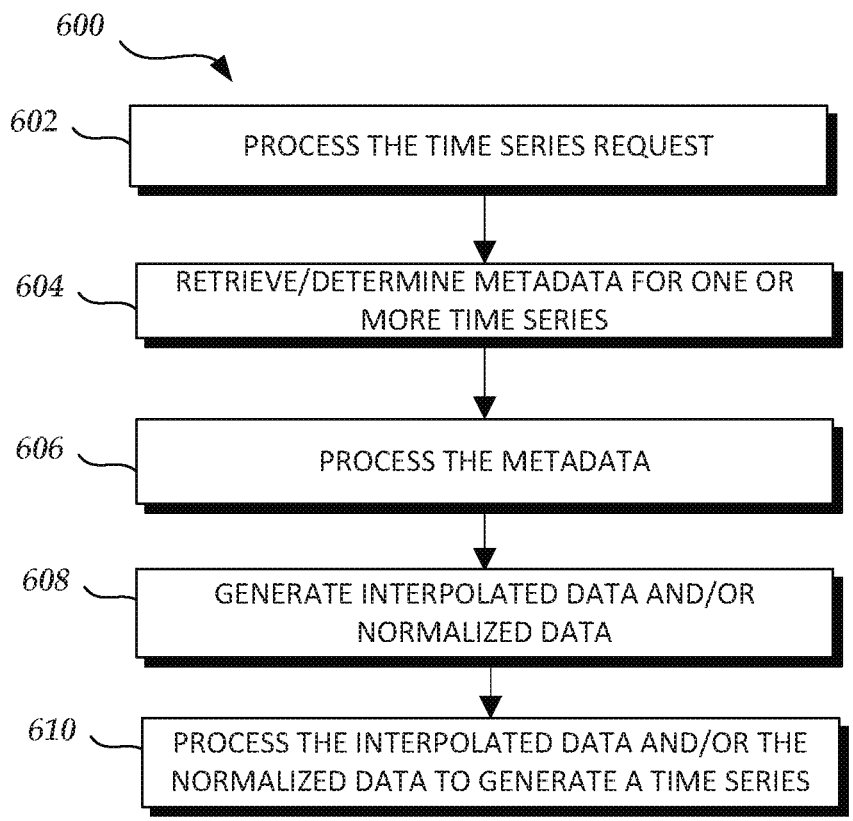
FIG. 6 is a flowchart of a method for time series interpolation, according to some embodiments of the present disclosure.

FIG. 6 is a flowchart of a method for time series interpolation and/or time series normalization, according to some embodiments of the present disclosure. Although the method 600 is described in conjunction with the systems of FIG. 1, any system configured to perform the method, in any order, is within the scope of this disclosure. The method 600 may be performed by the various components of the time series service 100 of FIG. 1 as discussed herein, including the communication interface 106, the query executor 108, and/or the backend interface 112. Depending on the embodiment, the method 600 may include fewer or additional blocks and/or the blocks may be performed in an order different than is illustrated. Blocks of the method 600 may be similar to blocks of any other method described herein. The techniques and/or algorithms of a block of the method 600 may describe the techniques and/or algorithms that can be used at a block of any other the method described herein. For example, one or more of the blocks of FIG. 6 may be performed at blocks 404 and/or 410 of FIG. 4. Additionally or alternatively, the method 600 may be combined with any other method described herein.

At block 602, the query executor 108 processes the time series requests. Processing a time series request can include determining one or more parameters from the request. For example, the API of the time series service 100 may enable an external call to the service 100 to specify one or more interpolation configuration parameters. The example interpolation configuration parameters can specify or include one or more interpolation operations, such as, a "none" interpolation operation, a "nearest" interpolation operation, a "previous" interpolation operation, a "next" interpolation operation, a linear interpolation operation, and/or a polynomial interpolation operation.

In some embodiments, the example interpolation configuration parameters can specify or include one or more particular interpolation operations for a particular phase. An example set of interpolation configuration parameters includes {before phase: none; internal phase: none; and after phase: none} that specifies that the "none" interpolation operation should be applied. The interpolation of FIGS. 5A-5b may correspond to the "none" interpolation operation. Another example set of interpolation configuration parameters includes {before phase: nearest; internal phase: nearest; and after phase: nearest} that specifies that the "nearest" interpolation operation should be applied. Yet another example set of interpolation configuration parameters includes {before phase: nearest; internal phase: linear; and after phase: nearest} that specifies that, where applicable, the "nearest" interpolation operation and the linear interpolation operation should be applied.

At block 604, the query executor 108 receives and/or determines metadata for the one or more time series. As described herein, example metadata includes a time unit for a particular time series, such as, but not limited to, second, millisecond, or microsecond.

In some embodiments, the metadata can be retrieved from the metadata storage 110. In an example, first metadata including a first association between a first time series and a first time unit, and second metadata including a second association between a second time series and a second time unit is stored in the metadata storage 110.

At block 606, the query executor 108 processes the metadata. The query executor 108 can determine, using the first metadata and the second metadata, that the first time unit and the second time unit are different. For example, the query executor 108 can determine that a first time series is associated with a first time unit (in seconds) and that a second time series is associated with a second time unit (microseconds). The query executor 108 can further determine the relative granularity of the first time unit to the second time unit. For example, the query executor 108 can determine that a second time unit is more granular than the first time unit, or vice versa.

At block 608, the query executor 108 generates interpolated data and/or normalized data. In some embodiments, at least one of the first time series or second time series identified in the time series request may cause the time series service 100 to generate interpolated data for the first time series or second time series, such that the time series may be in a state for an operation to be performed on both data sets.

The query executor 108 can use the "none" interpolation operation, which may be described in further detail with respect to FIG. 5B. as described herein, the "none" interpolation operation can include: identifying a first set of timestamps from the first time series and a second set of timestamps from the second time series; identifying, from the second set of timestamps, a second subset of timestamps that correspond to the granularity of the first time unit; generating, from the first time series and the first set of timestamps, a first data set; and generating, from the second time series and the second subset of timestamps, a second interpolated data set.

Additionally or alternatively, the query executor 108 can execute one or more of the "none" interpolation operation, a "nearest" interpolation operation, a "previous" interpolation operation, a "next" interpolation operation, a linear interpolation operation, and/or a polynomial interpolation operation, which may be described in further detail with respect to FIGS. 5A-5G. Further, the query executor 108 can take into consideration one of the three phases for determining which interpolation operation to perform.

The query executor 108 can generate normalized data. The time series data can be stored as (timestamp, value) pairs. In some embodiments, the timestamp can be an integer, such as a long integer, which may not be associated with any time unit. As described herein, the metadata can indicate the time unit of a time series. Thus, a first time series can be stored as (1, 0.5), (2, 1.5), and (3, 2.5) in seconds or a second time series can be stored as (1000, 0.5), (2000, 1.5), and (3000, 2.5) in milliseconds. To perform an operation on two or more time series, the query executor 108 can normalize one or more of the time series to a common time unit. In the example, the query executor 108 determines that the second time series has the most granular time unit (milliseconds), and, therefore, the query executor 108 normalizes the first time series to the more granular time unit. The query executor 108 applies an operation to the first time series to convert the time series to the more granular time unit. In the example, the query executor 108 wraps the first time series in an operation that time scales the time series, such as by multiplying each timestamp by a constant factor of 1000. Thus, a normalized time series from the first time series would have timestamps in the same format and/or the same granularity of the second time series to perform on or more additional operations.

In some embodiments, generating normalized data can include applying a conversion operation, such as a conversion function. In an example with a second time series having a more granular time unit than a second time series, the query executor 108 can generate a normalized set of timestamps from the first set of timestamps and the second time unit. The query executor 108 can generate a normalized data set from the first time series and the second time unit. The query executor 108 can apply a time scaling function to each timestamp from the first set of timestamps where the time scaling function converts a timestamp from the first time unit to the second time unit. In some embodiments, the query executor 108 accesses predetermined conversion functions based on an input time unit and an output time unit (where the timestamps are converted from the input time unit to the output time unit). The predetermined conversion functions can indicate conversions between seconds, milliseconds, microseconds, minutes, hours, etc. In other embodiments, the query executor 108 can dynamically determine the scaling function using algebraic logic and the input time unit and the output time unit. Example time scaling functions can include division and/or multiplication, such as dividing and/or multiplying by one or more constant values.

At block 610, the query executor 108 can process the interpolated data and/or normalized to generate one or more new time series. Example new time series generated by the query executor 108 can include the time series 507, 512A, 512B, 512C, and 512D of FIGS. 5B and 5D-5G, respectively.

Example Time Series Efficiency/Optimization Processes

Figure 7:
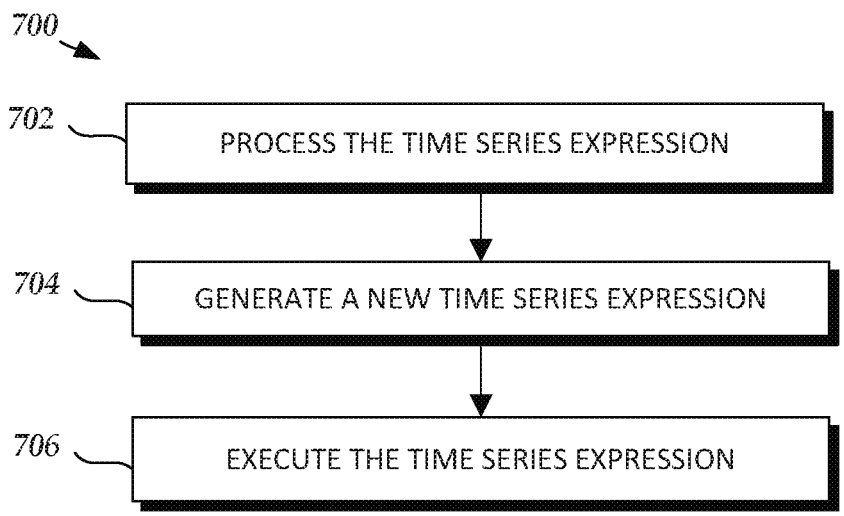
FIG. 7 is a flowchart of a method for efficient time series expression generation and/or execution, according to some embodiments of the present disclosure.

FIG. 7 is a flowchart of a method for efficient time series expression generation and/or execution, according to some embodiments of the present disclosure. Although the method 700 is described in conjunction with the systems of FIG. 1, any system configured to perform the method, in any order, is within the scope of this disclosure. The method 700 may be performed by the various components of the time series service 100 of FIG. 1 as discussed herein, including the communication interface 106, the query executor 108, and/or the backend interface 112. Depending on the embodiment, the method 700 may include fewer or additional blocks and/or the blocks may be performed in an order different than is illustrated. Blocks of the method 700 may be similar to blocks of any other method described herein. The techniques and/or algorithms of a block of the method 700 may describe the techniques and/or algorithms that can be used at a block of any other the method described herein. For example, one or more of the blocks of FIG. 7 may be performed at blocks 404, 406, 408, and/or 410 of FIG. 4. Additionally or alternatively, the method 700 may be combined with any other method described herein.

At block 702, the query executor 108 processes the time series expression of the time series request. Example time series expressions are the expressions 312 and 324 of FIGS. 3A and 3B, respectively. A time series expression can define how one or more data sources may be queried and/or how to process the results of the queries. Accordingly, a time series expression can include two or more nodes, such as nodes in a tree, where a node can correspond to at least one of a time series operation, a combined operation, a query, and/or one or more time series, such as one or more time series indicators. To improve the efficiency of the time series expression, the query executor 108 can identify a number of nodes that correspond to a time series operation.

In some embodiments, the query executor 108 processes the time series expression by evaluating one or more query nodes. An example query node is the query node 326 of FIG. 3B. A query node can specify a time series query to be executed by the query executor 108. The query executor 108 can retrieve the time series results by executing the query of the query node. As described herein, an example query can correspond to the following pseudocode: "SELECT [TIME SERIES METADATA] FROM DATA_SOURCE WHERE [QUERY_PARAMETERS]."

At block 704, the query executor 108 generates a new time series expression. In some embodiments, the new time series expression may be more efficient than the original time series expression. For example, as described with respect to FIG. 3A, the query executor 108 can generate a combined node operation from two or more operation nodes to reduce the number of sub-nodes in a time series expression. The new time series expression can include the generated combined node operation instead of the two or more operation nodes. As described herein, the generated time series expression may result in faster computer processing and/or a reduced burden on a computer processor since the computational operations may be optimized.

In some embodiments, the query executor 108 replaces one or more nodes in the original time series expression to generate a new time series expression. In the example time series expression with a query node, such as the query node 326 of FIG. 3B, the query executor 108 can replace the query node with the identified time series indicators. Accordingly, the query executor 108 can generate a fully planned time series expression by replacing one or more query nodes in the original time series expression.

At block 706, the backend interface 112 executes the new times series expression to retrieve one or more results from one or more time series databases. As described herein, the new time series expression can include information regarding which particular time series database to retrieve data from and/or query for each respective time series indicator. The query executor 108 can apply one or more operations of the new time series expression to generate data, such as one or more data values and/or new time series.

Figure 8:
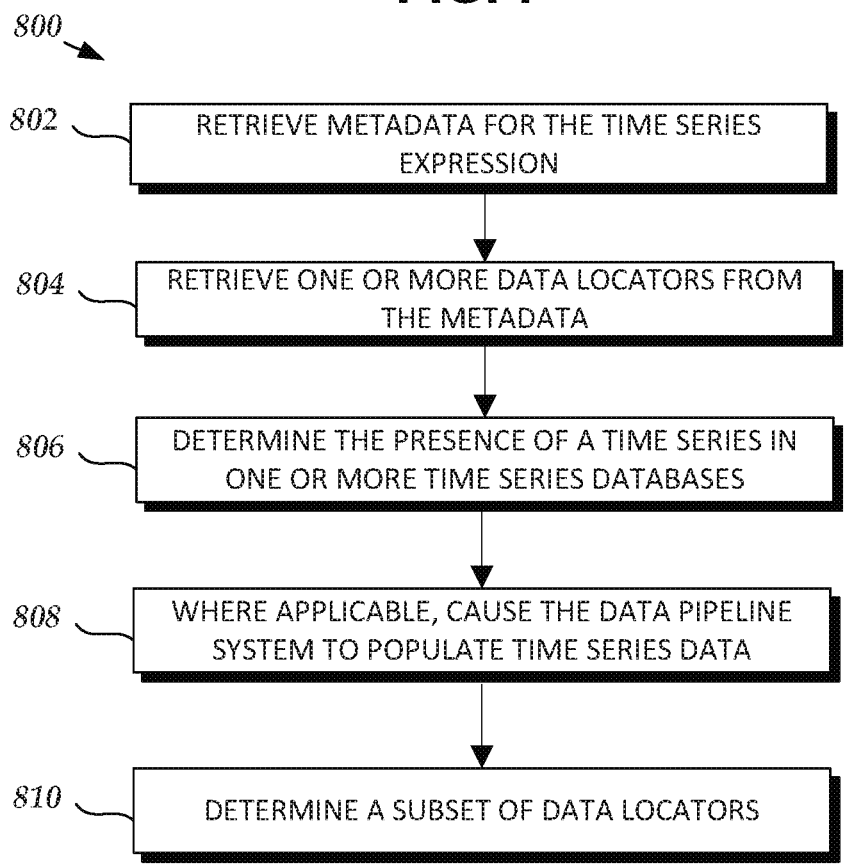
FIG. 8 is a flowchart of a method for efficient location of time series data, according to some embodiments of the present disclosure.

FIG. 8 is a flowchart of a method for efficient location of time series data, according to some embodiments of the present disclosure. Although the method 800 is described in conjunction with the systems of FIG. 1, any system configured to perform the method, in any order, is within the scope of this disclosure. The method 800 may be performed by the various components of the time series service 100 of FIG. 1 as discussed herein, including the communication interface 106, the query executor 108, and/or the backend interface 112. Depending on the embodiment, the method 800 may include fewer or additional blocks and/or the blocks may be performed in an order different than is illustrated. Blocks of the method 800 may be similar to blocks of any other method described herein. The techniques and/or algorithms of a block of the method 800 may describe the techniques and/or algorithms that can be used at a block of any other the method described herein. For example, one or more of the blocks of FIG. 8 may be performed at blocks 404, 406, and/or 408 of FIG. 4. Additionally or alternatively, the method 800 may be combined with any other method described herein.

At block 802, the query executor 108 retrieves metadata from the metadata storage 110 based on the time series expression. The query executor 108 can retrieve metadata for respective time series identified by the time series expression. Example metadata can include one or more data locators that specify where a time series is located and/or could potentially be located.

At block 804, the query executor 108 retrieves one or more data locators from the metadata. In some embodiments, a particular time series may be associated with two or more data locators that indicates that the time series is located and/or could potentially be located in two or more data sources.

At block 806, the query executor 108 can determine whether a time series is present in one or more time series databases. In some embodiments, a data locator identifying a database for time series is indicative of the presence of the time series in a database. In other embodiments, the query executor 108 queries the database indicated by the data locator to verify that the time series is present in the time series database. Thus, the query executor 108 can determine if a time series is not present in a time series database.

At block 808, the query executor 108 can cause the data pipeline system 134 to populate time series data where the time series data is not present in a time series database. The query executor 108 can issue a command via the backend interface 112 to the data pipeline system 134 to store particular time series data in a time series database. In some embodiments, the time series service 100 receives a notification when the population of the time series data has been completed. Further, the time series service 100 can store metadata regarding the newly populated time series in the metadata storage 110. Example metadata for the newly populated time series include a time unit associated with the time series.

At block 810, the query executor 108 determines a subset of data locators for the time series expression. The query executor 108 can select a subset of the data locators based on conditional logic. The conditional logic can specify a preference for the query executor 108 to select a minimum number of time series databases and/or data pipeline systems to query and/or communicate with. For example, if the query locator 108 determines that a first time series is present in a first time series database and a second time series database, and a second time series is present in the second time series database, the query locator 108 can select the second time series database to efficiently query both the first and second time series instead of inefficiently querying a greater number of databases. The query executor 108 can also include additional conditional logic that specifies a preference for particular time series databases over others, based on expected responsiveness, query times, and/or distance. Additional conditional logic can be based on other information, such as whether the time series request is from an interactive graphical user interface or a batch process. For example, if a request is from an interactive graphical user interface, then a faster time series database and/or a database with lower latency may be identified over a less performant time series database. Alternatively, if a request is for a batch process, then a slower backend system or one with higher latency may be identified to service the time series query.

Implementation Mechanisms

The various computing device(s) discussed herein, such as the time series service 100, the communication interface 106, the query generator 108, the backend interface 112, and/or the user computing device 102, are generally controlled and coordinated by operating system software, such as, but not limited to, iOS, Android, Chrome OS, Windows XP, Windows 7, Windows 8, Unix, Linux, or other compatible operating systems. In other embodiments, the computing devices may be controlled by a proprietary operating system. Conventional operating systems control and schedule computer processes for execution, perform memory management, provide file system, networking, I/O services, and provide a user interface functionality, among other things. The time series service 100 may be hosted and/or executed on one or more computing devices with one or more hardware processors and with any of the previously mentioned operating system software.

FIG. 9 is a block diagram that illustrates example components of the time series service 100. While FIG. 9 refers to the time series service 100, any of the other computing devices, modules, services, and/or user computing devices discussed herein may have some or all of the same or similar components.

The time series service 100 may execute software, e.g., standalone software applications, applications within browsers, network applications, etc., whether by the particular application, the operating system, or otherwise. Any of the systems discussed herein may be performed by the time series service 100 and/or a similar computing system having some or all of the components discussed with reference to FIG. 9.

The time series service 100 includes a bus 902 or other communication mechanism for communicating information, and a hardware processor, or multiple processors, 904 coupled with bus 902 for processing information.

The time series service 100 also includes a main memory 906, such as a random access memory (RAM), cache and/or other dynamic storage devices, coupled to bus 902 for storing information and instructions to be executed by processor(s) 904. Main memory 906 also may be used for storing temporary variables or other intermediate information during execution of instructions to be executed by processor(s) 904. Such instructions, when stored in storage media accessible to processor(s) 904, render the time series service 100 into a special-purpose machine that is customized to perform the operations specified in the instructions. Such instructions, as executed by hardware processors, may implement the methods and systems described herein for generating and/or executing efficient queries.

The time series service 100 further includes a read only memory (ROM) 908 or other static storage device coupled to bus 902 for storing static information and instructions for processor(s) 904. A storage device 910, such as a magnetic disk, optical disk, or flash drive, etc., is provided and coupled to bus 902 for storing information and instructions. The communication interface 106, the query generator 108, and/or the backend interface 112 of FIG. 1 may be stored on the main memory 906 and/or the storage device 910.

The time series service 100 and/or user computing device 102 may be coupled via bus 902 to a display 912, such as a LCD display or touch screen, for displaying information to a computer user. An input device 914 is coupled to bus 1002 for communicating information and command selections to processor 904. One type of input device 914 is a keyboard including alphanumeric and other keys. Another type of input device 914 is a touch screen.

In general, the word "instructions," as used herein, refers to logic embodied in hardware or firmware, or to a collection of software units, possibly having entry and exit points, written in a programming language, such as, but not limited to, Java, Lua, C, C++, or C#. A software unit may be compiled and linked into an executable program, installed in a dynamic link library, or may be written in an interpreted programming language such as, but not limited to, BASIC, Perl, or Python. It will be appreciated that software units may be callable from other units or from themselves, and/or may be invoked in response to detected events or interrupts. Software units configured for execution on computing devices by their hardware processor(s) may be provided on a computer readable medium, such as a compact disc, digital video disc, flash drive, magnetic disc, or any other tangible medium, or as a digital download (and may be originally stored in a compressed or installable format that requires installation, decompression or decryption prior to execution). Such software code may be stored, partially or fully, on a memory device of the executing computing device, for execution by the computing device. Software instructions may be embedded in firmware, such as an EPROM. It will be further appreciated that hardware modules may be comprised of connected logic units, such as gates and flip-flops, and/or may be comprised of programmable units, such as programmable gate arrays or processors. Generally, the instructions described herein refer to logical modules that may be combined with other modules or divided into sub-modules despite their physical organization or storage.

The time series service 100, or components of it, such as the communication interface 106, the query generator 108, and/or the backend interface 112 of FIG. 1, may be programmed, via executable code instructions, in a programming language.

The term "non-transitory media," and similar terms, as used herein refers to any media that store data and/or instructions that cause a machine to operate in a specific fashion. Such non-transitory media may comprise non-volatile media and/or volatile media. Non-volatile media includes, for example, optical or magnetic disks, such as storage device 910. Volatile media includes dynamic memory, such as main memory 906. Common forms of non-transitory media include, for example, a floppy disk, a flexible disk, hard disk, solid state drive, magnetic tape, or any other magnetic data storage medium, a CD-ROM, any other optical data storage medium, any physical medium with patterns of holes, a RAM, a PROM, and EPROM, a FLASH-EPROM, NVRAM, any other memory chip or cartridge, and networked versions of the same.

Non-transitory media is distinct from but may be used in conjunction with transmission media. Transmission media participates in transferring information between non-transitory media. For example, transmission media includes coaxial cables, copper wire and fiber optics, including the wires that comprise bus 902. Transmission media can also take the form of acoustic or light waves, such as those generated during radio-wave and infra-red data communications.

Bus 902 carries data to main memory 906, from which the processor(s) 904 retrieves and executes the instructions. The instructions received by main memory 906 may retrieve and execute the instructions. The instructions received by main memory 906 may optionally be stored on storage device 910 either before or after execution by computer hardware processor(s) 904.

The time series service 100 also includes a communication interface 918 coupled to bus 902. Communication interface 918 provides a two-way data communication coupling to a network link 920 that is connected to a local network 922. Wireless links may also be implemented. In any such implementation, communication interface 918 sends and receives electrical, electromagnetic or optical signals that carry digital data streams representing various types of information.

Network link 920 typically provides data communication through one or more networks to other data devices. For example, network link 920 may provide a connection through local network 922 to a host computer 924 or to data equipment operated by an Internet Service Provider (ISP) 926. ISP 926 in turn provides data communication services through the world wide packet data communication network now commonly referred to as the "Internet" 928. Local network 922 and Internet 928 both use electrical, electromagnetic or optical signals that carry digital data streams. The signals through the various networks and the signals on network link 920 and through communication interface 918, which carry the digital data to and from the time series service 100, are example forms of transmission media.

A network, such as the network 160 of FIG. 1, may comprise, but is not limited to, one or more local area networks, wide area network, wireless local area network, wireless wide area network, the Internet, or any combination thereof.

The time series service 100 can send messages and receive data, including program code, through the network(s), network link 920 and communication interface 918. In the Internet example, a server 930 might transmit a requested code for an application program through Internet 928, ISP 926, local network 922 and communication interface 918.

The received code may be executed by processor(s) 904 as it is received, and/or stored in storage device 910, or other non-volatile storage for later execution.

In some embodiments, the time series service 100 and/or the user computing device 102 may operate in a distributed computing environment including several computer systems that are interconnected using one or more computer networks. The time series service 100 and/or the user computing device 102 could also operate within a computing environment having a fewer or greater number of devices than are illustrated in FIG. 1 and/or FIG. 9. Thus, the depiction of time series service 100 and/or the user computing device 102 in FIG. 1 and/or FIG. 9 should be taken as illustrative and not limiting to the present disclosure. For example, the time series service 100 and/or the user computing device 102 could implement various Web services components and/or peer-to-peer network configurations to implement at least a portion of the processes described herein. For example, multiple servers and/or processes may process and/or analyze items and/or present a user interface in a distributed manner, as described herein.

Each of the processes, methods, and algorithms described in the preceding sections may be embodied in, and fully or partially automated by, code instructions executed by one or more computer systems or computer processors comprising computer hardware. The processes and algorithms may be implemented partially or wholly in application-specific circuitry.

The various features and processes described above may be used independently of one another, or may be combined in various ways. All possible combinations and subcombinations are intended to fall within the scope of this disclosure. In addition, certain method or process blocks may be omitted in some implementations. The methods and processes described herein are also not limited to any particular sequence, and the blocks or states relating thereto can be performed in other sequences that are appropriate. For example, described blocks or states may be performed in an order other than that specifically disclosed, or multiple blocks or states may be combined in a single block or state. The example blocks or states may be performed in serial, in parallel, or in some other manner. Blocks or states may be added to or removed from the disclosed example embodiments. The example systems and components described herein may be configured differently than described. For example, elements may be added to, removed from, or rearranged compared to the disclosed example embodiments.

Conditional language, such as, among others, "can," "could," "might," or "may," unless specifically stated otherwise, or otherwise understood within the context as used, is generally intended to convey that certain embodiments include, while other embodiments do not include, certain features, elements and/or steps. Thus, such conditional language is not generally intended to imply that features, elements and/or steps are in any way required for one or more embodiments or that one or more embodiments necessarily include logic for deciding, with or without user input or prompting, whether these features, elements and/or steps are included or are to be performed in any particular embodiment.

The term "a" as used herein should be given an inclusive rather than exclusive interpretation. For example, unless specifically noted, the term "a" should not be understood to mean "exactly one" or "one and only one"; instead, the term "a" means "one or more" or "at least one," whether used in the claims or elsewhere in the specification and regardless of uses of quantifiers such as "at least one," "one or more," or "a plurality" elsewhere in the claims or specification.

The term "comprising" as used herein should be given an inclusive rather than exclusive interpretation. For example, a general purpose computer comprising one or more processors should not be interpreted as excluding other computer components, and may possibly include such components as memory, input/output devices, and/or network interfaces, among others.

Any process descriptions, elements, or blocks in the flow diagrams described herein and/or depicted in the attached figures should be understood as potentially representing units, segments, or portions of code which include one or more executable instructions for implementing specific logical functions or steps in the process. Alternate implementations are included within the scope of the embodiments described herein in which elements or functions may be deleted, executed out of order from that shown or discussed, including substantially concurrently or in reverse order, depending on the functionality involved, as would be understood by those skilled in the art.

It should be emphasized that many variations and modifications may be made to the above-described embodiments, the elements of which are to be understood as being among other acceptable examples. All such modifications and variations are intended to be included herein within the scope of this disclosure. The foregoing description details certain embodiments of the invention. It will be appreciated, however, that no matter how detailed the foregoing appears in text, the invention can be practiced in many ways. As is also stated above, it should be noted that the use of particular terminology when describing certain features or aspects of the invention should not be taken to imply that the terminology is being re-defined herein to be restricted to including any specific characteristics of the features or aspects of the invention with which that terminology is associated. The scope of the invention should therefore be construed in accordance with the appended claims and any equivalents thereof

What is claimed is:

1. A computing system comprising:
a non-transitory computer storage medium configured to store metadata associated with time series; and
one or more hardware computer processors programmed, via executable code instructions, to implement a time series service to:
receive a first time series expression identifying a first time series indicator and a plurality of nodes, wherein each node corresponds to a time series operation performable on one or more time series;
determine, based on the stored metadata, first metadata associated with the first time series indicator;
generate a second time series expression based at least on the first metadata and the first time series expression, the second time series expression including a combined operation node associated with and combining operations from two or more of the plurality of nodes, wherein the second time series expression comprises the combined operation node instead of the two or more of the plurality of nodes;
access a first time series; and
execute, according to the second time series expression, the combined operation node on first data associated with the first time series.

2. The computing system of claim 1,
wherein the first metadata includes a first association between the first time series and a first time unit, and a second metadata includes a second association between a second time series and a second time unit, and
wherein the one or more hardware computer processors are further configured to at least:
determine, using the first metadata and the second metadata, that the first time unit and the second time unit are different;
determine that the second time unit is more granular than the first time unit;
identify a first set of timestamps from the first time series and a second set of timestamps from the second time series;
identify a granularity of the second time unit;
generate a normalized set of timestamps from the first set of timestamps and the second time unit;
generate, from the first time series and the normalized set of timestamps, a first normalized data set; and
generate, from the second time series and the second set of timestamps, a second data set, wherein the first data comprises the first normalized data set and second data comprises the second data set.

3. The computing system of claim 2, wherein generating the normalized set of timestamps from the first set of timestamps and the second time unit further comprises:
applying a time scaling function to each timestamp from the first set of timestamps, wherein the time scaling function converts a timestamp from the first time unit to the second time unit.

4. The computing system of claim 3, wherein the time scaling function comprises at least one of a multiplication operation or a division operation.

5. The computing system of claim 1, wherein a time series request further comprises an interpolation configuration parameter that indicates a type of interpolation to be performed.

6. The computing system of claim 1, wherein the first time series expression further comprises an indicator for an operation, the operation comprising at least one of: an addition operation, a subtraction operation, a division operation, a multiplication operation, a ratio determination operation, a square root operation, a zScore operation, a standard deviation operation, an average operation, a median operation, a mode of operation, a range operation, a maximum operation, or a minimum operation.

7. A computerized method, performed by a computing system having one or more hardware computer processors and one or more non-transitory computer readable storage device storing software instructions executable by the computing system to perform the computerized method comprising:

receiving a first time series expression identifying a first time series indicator and a plurality of nodes, wherein each node corresponds to a time series operation performable on one or more time series;

determining, based on stored metadata, first metadata associated with the first time series indicator;

generating a second time series expression based at least on the first metadata and the first time series expression, the second time series expression including a combined operation node associated with and combining operations from two or more of the plurality of nodes, wherein the second time series expression comprises the combined operation node instead of the two or more of the plurality of nodes;

accessing a first time series; and executing, according to the second time series expression, the combined operation node on first data associated with the first time series.

8. The method of claim 7, wherein the first metadata includes a first association between the first time series and a first time unit, and a second metadata includes a second association between a second time series and a second time unit.

9. The method of claim 8, further comprising:

determining, using the first metadata and the second metadata, that the first time unit and the second time unit are different;

determining that the second time unit is more granular than the first time unit;

identifying a first set of timestamps from the first time series and a second set of timestamps from the second time series;

identifying a granularity of the second time unit;

generating a normalized set of timestamps from the first set of timestamps and the second time unit;

generating, from the first time series and the normalized set of timestamps, a first normalized data set; and generating, from the second time series and the second set of timestamps, a second data set, wherein the first data comprises the first normalized data set and second data comprises the second data set.

10. The method of claim 9, wherein generating the normalized set of timestamps from the first set of timestamps and the second time unit further comprises:

applying a time scaling function to each timestamp from the first set of timestamps, wherein the time scaling function converts a timestamp from the first time unit to the second time unit.

11. The method of claim 10, wherein the time scaling function comprises at least one of a multiplication operation or a division operation.

12. The method of claim 7, wherein a time series request further comprises an interpolation configuration parameter that indicates a type of interpolation to be performed.

13. The method of claim 7, wherein the first time series expression further comprises an indicator for an operation, the operation comprising at least one of: an addition operation, a subtraction operation, a division operation, a multiplication operation, a ratio determination operation, a square root operation, a zScore operation, a standard deviation operation, an average operation, a median operation, a mode of operation, a range operation, a maximum operation, or a minimum operation.

* * * * *

UNITED STATES PATENT AND TRADEMARK OFFICE
CERTIFICATE OF CORRECTION

| | |
|---|---|
| PATENT NO. | : 11,397,730 B2 |
| APPLICATION NO. | : 16/535575 |
| DATED | : July 26, 2022 |
| INVENTOR(S) | : Benjamin Duffield |

It is certified that error appears in the above-identified patent and that said Letters Patent is hereby corrected as shown below:

In the Specification

Column 18, Line 56, delete "FIG. 514F" and insert -- FIG. 5F --.

Signed and Sealed this
Third Day of January, 2023

Katherine Kelly Vidal
*Director of the United States Patent and Trademark Office*